(12) United States Patent
Zhang et al.

(10) Patent No.: US 11,758,408 B2
(45) Date of Patent: Sep. 12, 2023

(54) SHARED RADIO BEARER AND MANAGEMENT OF UE RADIO ID AND RAN PATH

(71) Applicant: HUAWEI TECHNOLOGIES CO., LTD., Shenzhen (CN)

(72) Inventors: Hang Zhang, Nepean (CA); Jaya Rao, Ottawa (CA); Sophie Vrzic, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 218 days.

(21) Appl. No.: 16/562,269

(22) Filed: Sep. 5, 2019

(65) Prior Publication Data

US 2020/0084636 A1 Mar. 12, 2020

Related U.S. Application Data

(60) Provisional application No. 62/728,393, filed on Sep. 7, 2018.

(51) Int. Cl.
*H04W 16/14* (2009.01)
*H04W 28/02* (2009.01)
(Continued)

(52) U.S. Cl.
CPC ....... *H04W 16/14* (2013.01); *H04W 28/0268* (2013.01); *H04W 76/11* (2018.02); *H04W 80/02* (2013.01); *H04W 80/08* (2013.01)

(58) Field of Classification Search
CPC . H04W 16/14; H04W 28/0268; H04W 36/08; H04W 76/11; H04W 80/02; H04W 80/08; H04W 88/085
See application file for complete search history.

(56) References Cited

U.S. PATENT DOCUMENTS

| 2004/0047331 | A1 | 3/2004 | Jang |
| 2005/0043050 | A1* | 2/2005 | Lee ..................... H04W 72/005 |
| | | | 455/515 |

(Continued)

FOREIGN PATENT DOCUMENTS

| CN | 1839653 A | 9/2006 |
| CN | 102143532 A | 8/2011 |

(Continued)

OTHER PUBLICATIONS

NR; NR and NG-RAN Overall Description; Stage 2, 3GPP TS 38.300 V15.2.0 (Year: 2018).*

(Continued)

*Primary Examiner* — Melvin C Marcelo
*Assistant Examiner* — Natali Pascual Peguero

(57) ABSTRACT

There is provided a method and apparatus for data transmission using shared radio bearer in order to simplify the operation of RAN access node by reducing signalling overhead related to mobility and simplifying per UE RBs setup/release operation. Using the shared radio bearer, UE mobility operation becomes transparent to access node (e.g. edge cell) and to UE. There is also provided a method and apparatus for simplifying the operation of UE for RBs setup/release and to make the Layer 2 (L2) operation independent from mobility (e.g. independent from handover).

25 Claims, 17 Drawing Sheets

(51) Int. Cl.
*H04W 76/11* (2018.01)
*H04W 80/02* (2009.01)
*H04W 80/08* (2009.01)

(56) References Cited

U.S. PATENT DOCUMENTS

| | | |
|---|---|---|
| 2010/0265873 A1 | 10/2010 | Yi et al. |
| 2014/0126489 A1 | 5/2014 | Zakrzewski |
| 2015/0245255 A1 | 8/2015 | Van Phan et al. |
| 2017/0208508 A1 | 7/2017 | Laraqui et al. |
| 2017/0289767 A1 | 10/2017 | Yu et al. |
| 2019/0053102 A1 | 2/2019 | Oohira et al. |
| 2019/0289534 A1* | 9/2019 | Ryoo .................. H04W 76/27 |

FOREIGN PATENT DOCUMENTS

| | | |
|---|---|---|
| CN | 102439871 A | 5/2012 |
| CN | 103120004 A | 5/2013 |
| CN | 103563440 A | 2/2014 |
| EP | 3300288 A1 | 3/2018 |
| WO | 2012041363 A1 | 4/2012 |
| WO | 2017163735 A1 | 9/2017 |

OTHER PUBLICATIONS

"NR; NR and NG-RAN Overall Description; Stage 2"; 3GPP TS 38.300 V15.2.0 (Jun. 2018).
"NR; Radio Link Control (RLC) protocol specification"; 3GPP TS 38.322 V15.2.0 (Jun. 2018).
"NR; Packet Data Convergence Protocol (PDCP) specification"; 3GPP TS 38.323 V15.2.0 (Jun. 2018).
"NG-RAN; Architecture description"; 3GPP TS 38.401 V15.2.0 (Jun. 2018).
Zhang Hechang, Research on Resource Allocation and Scheduling Scheme of Device-to-Device Communication in LTE Networks, Nanjing University of Posts and Telecommunications, 2018, Issue 02, 2 Pages (abstract).

* cited by examiner

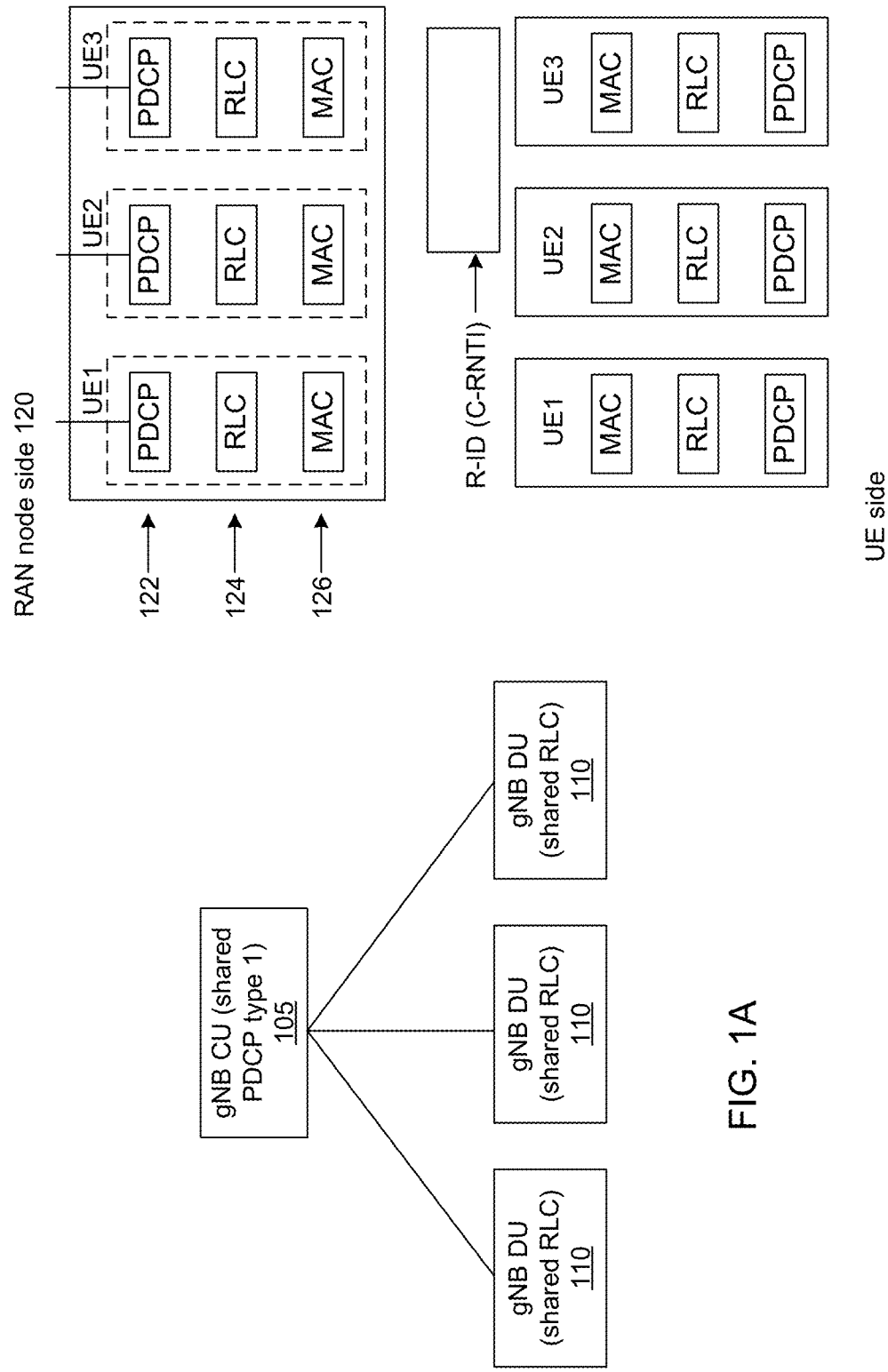

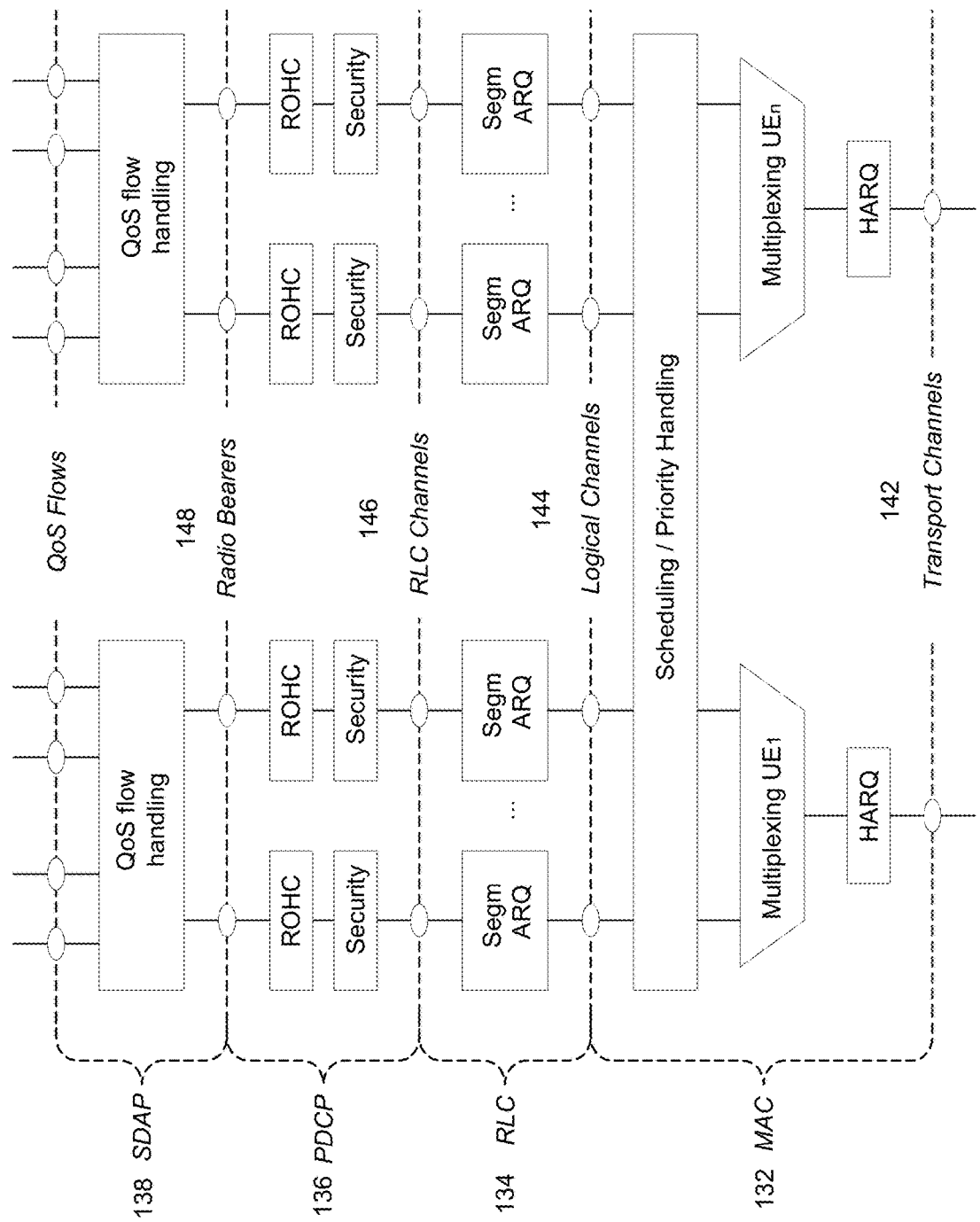

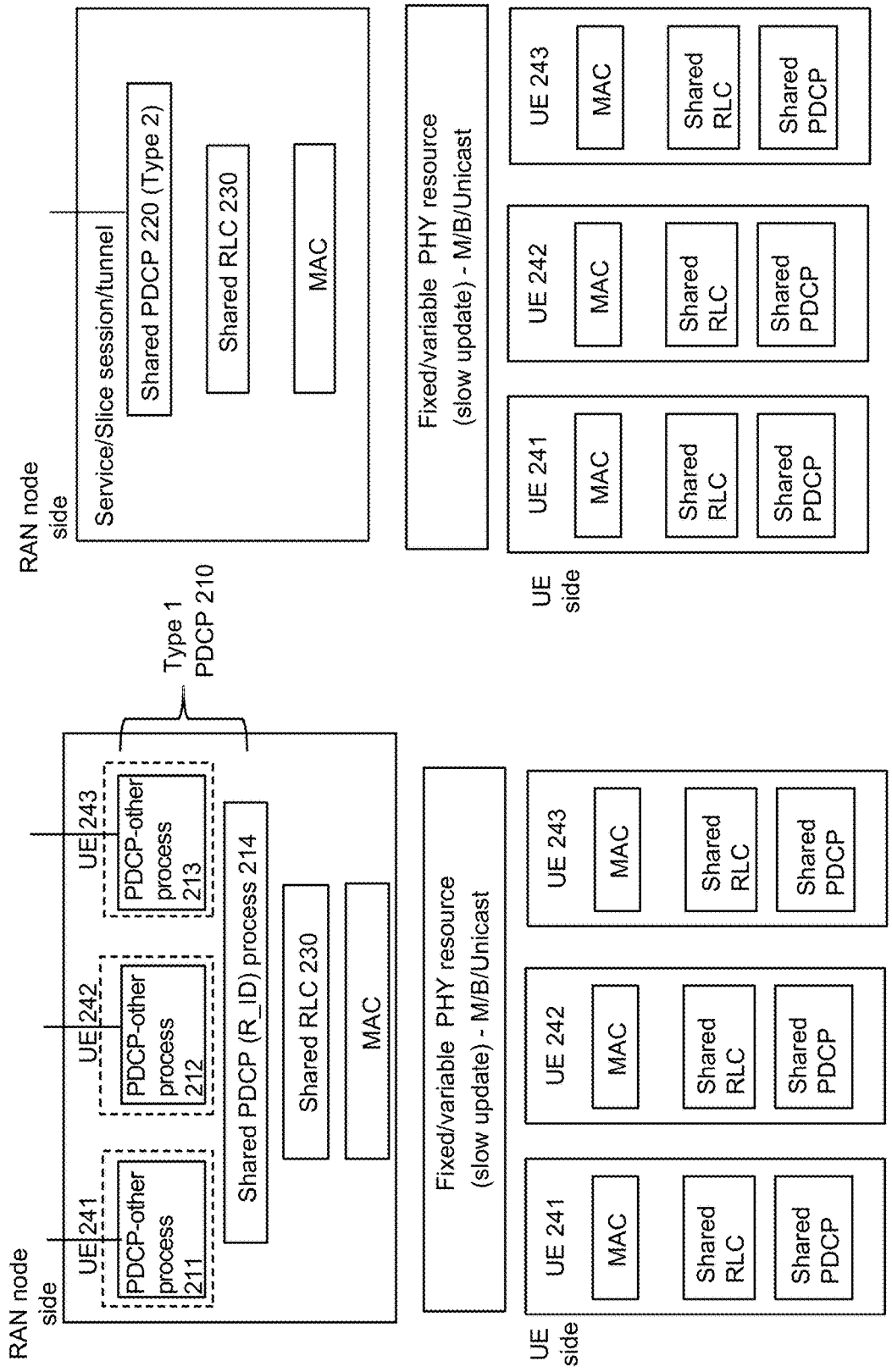

SHARED RADIO BEARER AND MANAGEMENT OF UE RADIO ID AND RAN PATH

CROSS-REFERENCE TO RELATED APPLICATIONS

This application claims the benefit and priority from U.S. Provisional Patent Application No. 62/728,393 filed Sep. 7, 2018, the contents of which are incorporated herein by reference in their entirety.

FIELD OF THE INVENTION

The present invention pertains to the field of wireless communication networks and in particular to a method and apparatus for data transmission using shared radio bearer in such networks.

BACKGROUND

In current $3^{rd}$ Generation Partnership Project (3GPP) standards being developed for $5^{th}$ generation (5G) communication networks, the over-the-air (OTA) interface (e.g. between User Equipment (UE) and access node cell(s)) protocol stacks (e.g. involving data radio bearers (DRB) and signaling radio bearers (SRB)) are designed on 'per Quality of Service (QoS) flow' and 'per UE basis'. In this current design, the UE's OTA identifier (e.g. Radio-ID (R-ID)), which is used for OTA resource assignment, is assigned by the access radio node serving or anticipated to be serving a UE.

Currently, when the Radio Resource Control (RRC) status in the network is the RRC_CONNECTED state, a UE and target access node(s) establish SRB/DRB during handover (HO) and the HO related information is communicated to target access node(s). An access node needs to be aware of UE HO and also needs to perform the operation enabling HO. The operation includes assigning/releasing UE OTA ID (e.g. Cell Radio Network Temporary Identity (C-RNTI)) and setting up/releasing a number of RBs.

In addition, when the RRC status is in the RRC_INACTIVE state, data transmission results in a state transition back to RRC_CONNECTED, which introduces unnecessary latency or results in the use of RACH (Random Access Channel) and PAGING (broadcast) operations which may not be efficient for reliability support. In addition, when the RRC is in the RRC_INACTIVE state, data transmission may result in the access cell assigning an ID used for the OTA resource and a UE ID is needed in order for the access cell to forward the uplink (UL) packet to UE specific anchor (i.e. UE ID is needed for forwarding purposes). There are drawbacks to efficiency and latency due to such operations.

Therefore there is a need for a method and apparatus for data transmission using shared radio bearer that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments is to provide a method and apparatus for data transmission using shared radio bearer in order to simplify the operation of a radio access network (RAN) access node, and gNB. This can be done by reducing signalling overhead related to mobility and simplifying per-UE radio bearers (RBs) setup or release operations. Another object of embodiments is to make UE mobility transparent to access nodes (e.g. edge cell). Another object of embodiments is to provide a method and apparatus for simplifying the operation of UE for RBs setup or release operations and to make the Layer 2 (L2) operation independent from mobility (e.g. independent from handover).

In accordance with embodiments, there is provided an apparatus in a wireless communication network, comprising: a shared radio bearer (RB) layer 2 (L2) structure. The shared RB L2 structure includes a shared radio link control (RLC) sublayer comprising one or more shared RLC entities and a shared packet data convergence protocol (PDCP) sublayer comprising one or more shared PDCP entities. The shared RLC sublayer and the shared PDCP sublayer are implemented in one or more of: a user plane function of a core portion of the wireless communication network, a central unit (CU) of a generalized NodeB (gNB) in an access portion of the wireless communication network, a distributed unit (DU) of the gNB, and an access node in the access portion of the wireless communication network. The shared RB L2 structure is configured for communication between the apparatus and a plurality of user equipment devices (UEs) or equivalent wireless communication entities.

In accordance with embodiments, there is provided a method for wireless downlink communication with a plurality of user equipments (UEs). The method is performed by an apparatus which supports a shared radio bearer. The apparatus includes a plurality of per-UE packet data convergence protocol (PDCP) entities, a shared PDCP entity, a shared radio link control (RLC) entity and a shared medium access control (MAC) entity. The method includes receiving, by the shared PDCP entity, downlink data from one of the plurality of per-UE PDCP entities, the downlink data for transmission to a corresponding UE. The method further includes applying, by the shared PDCP entity, a PDCP header to said downlink data to produce PDCP downlink output, the PDCP header having a identifier (R-ID) value indicative of the corresponding UE. The method additionally includes performing, by the shared RLC entity, one or more downlink RLC operations on the PDCP downlink output to produce RLC downlink output and wirelessly transmitting, by the shared MAC entity, the RLC downlink output for reception by the corresponding UE.

In accordance with embodiments, three is provided a method for wireless uplink communication with a plurality of user equipments (UEs). The method is performed by an apparatus including which supports a shared radio bearer. The apparatus includes a plurality of per-UE packet data convergence protocol (PDCP) entities, a shared PDCP entity, a shared radio link control (RLC) entity and a shared medium access control (MAC) entity. The method includes wirelessly receiving, by the shared MAC entity, packet segments from the plurality of UEs, each packet segment including, in an RLC header thereof, a respective packet identifier indicative of a corresponding packet to which each packet segment belongs. The method further includes re-assembling, by the shared RLC entity, said packet segments into corresponding packets by collecting together packet segments having matching packet identifiers, the corresponding packets each having a PDCP header having an identifier (R-ID) value indicative of the corresponding UE. The method additionally includes associating, by the shared PDCP entity, each one of the corresponding packets with a corresponding originating one of the UEs based on the R-ID value and forwarding, by the shared PDCP entity, each one of the corresponding packets to a per-UE PDCP entity associated with the corresponding originating one of the one UEs associated with said one of the corresponding packets.

In accordance with embodiments, there is provided a method for wireless downlink communication with a plurality of user equipments (UEs). The method is performed by an apparatus which supports a shared radio bearer. The apparatus includes a shared packet data convergence protocol (PDCP) entity, a shared radio link control (RLC) entity and a shared medium access control (MAC) entity. The method includes receiving, by the shared PDCP entity, downlink data for transmission to a corresponding UE and performing, by the shared PDCP entity, one or more downlink PDCP operations on the downlink data to produce PDCP downlink output. The method further includes performing, by the shared RLC entity, one or more downlink RLC operations on the PDCP downlink output to produce RLC downlink output and wirelessly transmitting, by the shared MAC entity, the RLC downlink output for reception by the corresponding UE.

In accordance with embodiments, there is provided a method for wireless uplink communication with a plurality of user equipments (UEs). The method is performed by an apparatus which supports a shared radio bearer. The apparatus includes a shared packet data convergence protocol (PDCP) entity, a shared radio link control (RLC) entity and a shared medium access control (MAC) entity. The method includes wirelessly receiving, by the shared MAC entity, packet segments from the plurality of UEs, each packet segment including, in an RLC header thereof, a respective packet identifier indicative of a corresponding packet to which it belongs. The method further includes re-assembling, by the shared RLC entity, said packet segments into corresponding packets by collecting together packet segments having matching packet identifiers, the corresponding packets each having a PDCP header and performing, by the shared PDCP entity, one or more PDCP operations on said corresponding packets.

In accordance with embodiments, there is provided an apparatus in a wireless communication network. The apparatus can be implemented in one or more of: a user plane function of the core network, the centralized unit (CU) portion of a gNB, the distributed unit (DU) portion of a gNB, and an access node. The apparatus is used in wireless communication with connecting devices, referred to as UEs. The apparatus may be implemented in an access portion of the network, in a core portion of the network, or a combination thereof. The apparatus includes a shared radio bearer (RB) layer 2 (L2) structure. The shared radio bearer includes a shared radio link control (RLC) sublayer comprising one or more shared RLC entities and a shared packet data convergence protocol (PDCP) sublayer comprising one or more shared PDCP entities. The shared RB L2 structure is implemented in UE that communicates with network using shared RBs.

In accordance with embodiments, there is provided a method of operating an apparatus in a wireless communication network. The apparatus can be implemented in one or more of: a user plane function of the core network, the CU portion of a gNB, the DU portion of a gNB, and an access node. The method includes providing a shared radio bearer (RB) layer 2 (L2) structure which includes a shared radio link control (RLC) sublayer comprising one or more shared RLC entities and a shared packed data convergence protocol (PDCP) sublayer comprising one or more shared PDCP entities.

The shared PDCP and RLC entities can be implemented in particular portions of the apparatus. These options may allow separation of the shared PDCP and RLC entities for operational purposes. In one embodiment, all shared L2 protocol sublayers (e.g. shared PDCP sublayer, shared RLC sublayer) are implemented in the CU of the CU-DU (gNB) topology. In other embodiments, all shared L2 protocol sublayers are implemented in a user plane function (UPF) of a core network of the wireless communication network, or in a combination of the CU and the UPF. In other embodiments, the shared PDCP sublayer is implemented in the CU and shared RLC sublayer (and medium access control (MAC) sublayer) is implemented in the access nodes (or DU). The shared RLC sublayer (and MAC sublayer) may be implemented, in particular, in those access nodes or DUs which operate Uu interfaces (interface with UEs), wherein the UEs having corresponding shared RB structures. In some embodiments, the shared PDCP sublayer is implemented in the core network and the shared RLC sublayer (and MAC sublayer) are implemented in the access nodes or DUs. For each of these cases, the UEs also implement a corresponding shared RB L2 structure. When the shared RLC sublayer is implemented in the access nodes, and shared PDCP is implemented in, e.g., gNB-CU or UPF in core network the mobility operations become transparent to the access nodes.

The shared RB can be used in any communication scenarios where one wireless communication entity (such as UE, vehicle UE, access (edge) cell communicate with one or multiple other wireless communication entities. E.g., the shared BR can also be used for UE-to-UE (vehicle to vehicles) communications, where UEs (vehicles) implemented share RB.

In accordance with embodiments, there is provided an apparatus in a wireless communication network, for example as implemented in parts of the network as described above. The apparatus includes a plurality of per-UE packet data convergence protocol (PDCP) entities each configured to perform one or more PDCP operations on data associated with a corresponding one of a plurality of UEs and a shared radio bearer for wirelessly communicating with the plurality of UEs, the shared radio bearer operating on data for transmission to or received from the plurality of UEs. The shared radio bearer includes a shared packet data convergence protocol (PDCP) entity configured to receive downlink data from one of the per-UE PDCP entities, and apply a PDCP header to said downlink data to produce downlink output of the PCDP entity, wherein the PDCP header has an identifier value (R-ID) indicative of a corresponding one the plurality of UEs being a destination for the downlink data. The shared radio bearer further includes a shared radio link control (RLC) entity configured to receive the downlink output of the shared PDCP entity, perform one or more downlink RLC operations on the downlink data, and forward output of the downlink RLC operations to a medium access control (MAC) entity for transmission and receive uplink data from the MAC entity, perform one or more uplink RLC operations on the uplink data, and forward output of the uplink RLC operations the shared PDCP entity. The shared PDCP entity is further configured to receive the output of the uplink RLC operations, read an identifier value (R-ID) from a PDCP header of the output of the uplink RLC operations, and forward data contained in the output of the uplink RLC operations to one of the per-UE PDCP entities associated with the R-ID value.

In accordance with embodiments, there is provided an apparatus in a wireless communication network, for example as implemented in parts of the network as described above. The apparatus includes a shared radio bearer for wirelessly communicating with a plurality of UEs, the shared radio bearer operating on data for transmission to or received from the plurality of UEs. The shared radio bearer includes a shared packet data convergence protocol (PDCP) entity configured to receive downlink data for communication to one of the plurality of UEs, and perform one or more downlink PDCP operations on the downlink data. The shared radio bearer further includes a shared radio link control (RLC) entity configured to receive output of the downlink PDCP operations, perform one or more downlink RLC operations on the output of the downlink PDCP operations, and forward output of the downlink RLC operations to a medium access control (MAC) entity for transmission and receive uplink data from the MAC entity, perform one or more uplink RLC operations on the uplink data, and forward output of the uplink RLC operations to the shared PDCP entity. The shared PDCP entity further configured to receive the output of the uplink RLC operations and perform one or more uplink PDCP operations on the output of the uplink RLC operations.

According to embodiments, there is further provided a method for wireless uplink communication with a plurality of UEs. The method includes wirelessly receiving packet segments from the plurality of UEs, each packet segment including, in an RLC header thereof, a respective packet identifier indicative of a corresponding packet to which it belongs, by a common process and irrespective of identity of UEs from which the one or more packet segments originate and using a shared uplink RLC process applied to packet segments received from all of the plurality of UEs and irrespective of UE identity, re-assembling said packet segments into corresponding packets by collecting together packet segments having matching packet identifiers, if any, the corresponding packets each having a PDCP header. The method further includes subsequently associating each one of the corresponding packets with a corresponding originating one of the UEs based on PDCP header content and forwarding each one of the corresponding packets to a per-UE PDCP process associated with the corresponding originating one of the one UEs associated with said one of the corresponding packets.

In accordance with embodiments, there is provided a method for wireless uplink communication with a plurality of UEs. The method includes wirelessly receiving packet segments from the plurality of UEs, each packet segment including, in an RLC header thereof, a respective packet identifier indicative of a corresponding packet to which it belongs, by a common process and irrespective of identity of UEs from which the one or more packet segments originate. The method further includes using a shared uplink RLC process applied to packet segments received from all of the plurality of UEs and irrespective of UE identity, re-assembling said packet segments into corresponding packets by collecting together packet segments having matching packet identifiers, if any, the corresponding packets each having a PDCP header and using a shared PDCP process applied to packet segments received from all of the plurality of UEs and irrespective of UE identity, performing one or more PDCP operations on said corresponding packets.

In accordance with embodiments, there is provided a method for wireless downlink communication with a plurality of UEs. The method includes, by a shared radio bearer, receiving downlink data from one a plurality of per-UE packet data convergence protocol (PDCP) entities, the downlink data for transmission to a corresponding UE and applying a PDCP header to said downlink data to produce PDCP downlink output, the PDCP header having an identifier value (R-ID) indicative of the corresponding UE. The method further includes, by a shared radio bearer, performing one or more downlink RLC operations on the PDCP downlink output to produce RLC downlink output and wirelessly transmitting the RLC downlink output for reception by the corresponding UE using a shared MAC process.

According to embodiments, there is provided a method for wireless downlink communication with a plurality of UEs. The method includes, by a shared radio bearer receiving downlink data for transmission to a corresponding UE and performing one or more downlink PDCP operations on the downlink data to produce PDCP downlink output. The method further includes, by a shared radio bearer, performing one or more downlink RLC operations on the PDCP downlink output to produce RLC downlink output; and wirelessly transmitting the RLC downlink output for reception by the corresponding UE using a shared MAC process.

In accordance with embodiments, there is provided a path manager apparatus in a wireless communication network. The path manager apparatus is configured to receive location information for a mobile UE and determine one or more access nodes capable of forwarding downlink data to the mobile UE based on the location information. The path manager apparatus is further configured to transmit, to a PDCP entity shared by a plurality of access nodes including the determined one or more access nodes, an indication of the determined one or more access nodes capable of forwarding downlink data to the mobile UE, wherein the PDCP entity subsequently transmits PDCP PDUs, for reception by the mobile UE, to at least one of the determined one or more access nodes.

In accordance with embodiments, there is provided a R-ID manager apparatus in a wireless communication network. The R-ID manager is configured to maintain a list of access nodes associated with a common zone, maintain a pool of assignable R-ID values for the common zone. Responsive to a UE becoming associated with one or more access nodes associated with the common zone, the R-ID manager is further configured to assig a currently unassigned one of the R-ID values to the UE, cause one or more PDCP entities to be informed of the assigned R-ID value for use thereby in uplink communication, downlink communication, or both and cause the UE to be informed of the assigned R-ID value for use thereby in uplink communication, downlink communication, or both.

BRIEF DESCRIPTION OF THE FIGURES

Further features and advantages of the present invention will become apparent from the following detailed description, taken in combination with the appended drawings, in which:

FIG. 1A is a schematic diagram illustrating an architecture of a gNB that is logically split in CU (Central Unit) and DU (Distributed Unit) in a form of star topology.

FIG. 1B is a schematic diagram illustrating the current structure of L2 at both RAN node side and UE side.

FIG. 1C is a schematic diagram illustrating the current per QoS flow/per UE structure of downlink L2 at network side.

FIG. 2A is a schematic diagram illustrating shared RB Layer 2 (L2) structure in network side with Type 1 PDCP in accordance with embodiments.

FIG. 2B is a schematic diagram illustrating shared RB L2 structure in network side with Type 2 PDCP in accordance with embodiments.

It will be noted that throughout the appended drawings, like features are identified by like reference numerals.

DETAILED DESCRIPTION

Figure 3A:
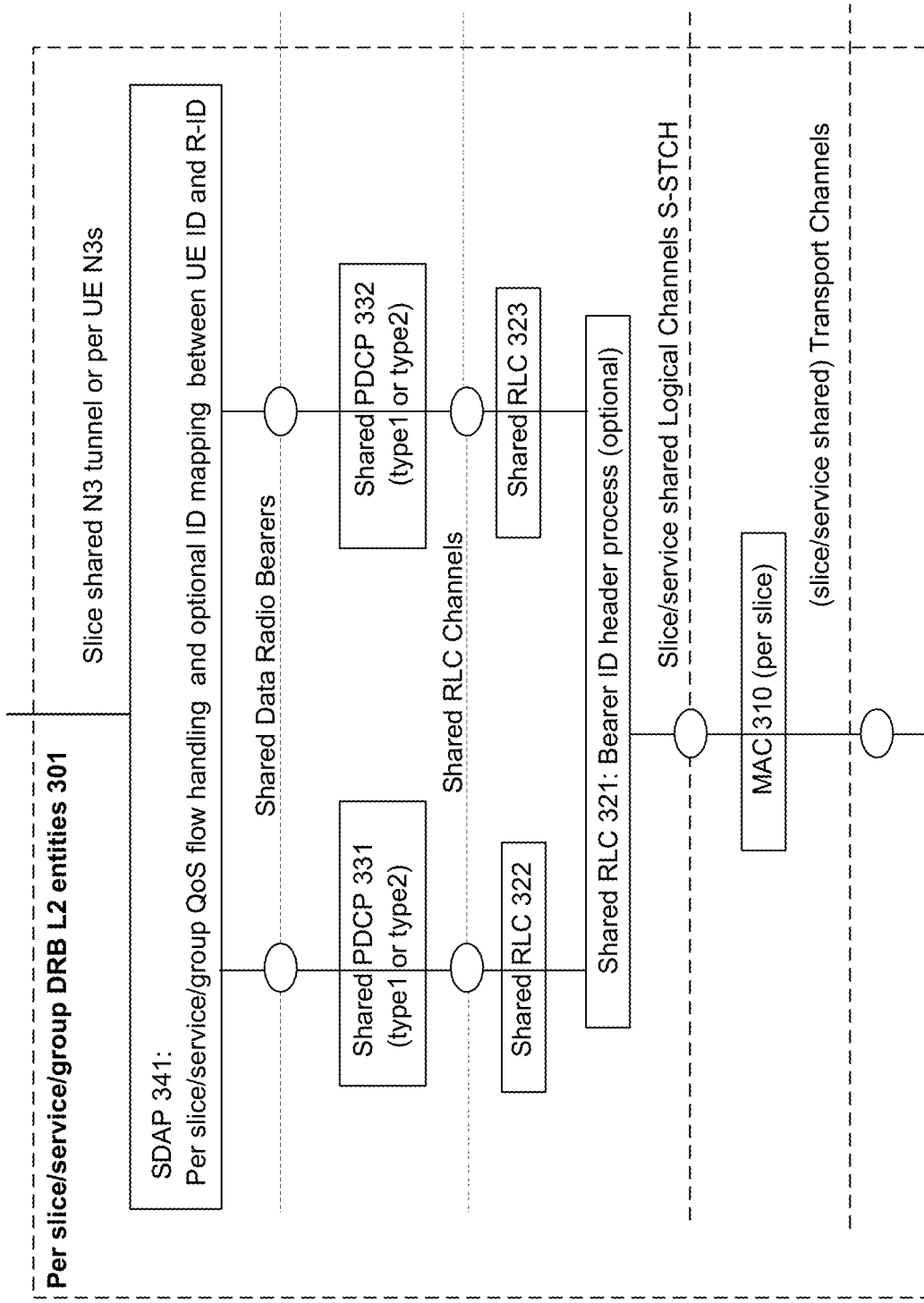
FIG. 3A is a schematic diagram illustrating the shared data radio bearer (DRB) L2 structure at network side in accordance with embodiments.

Various embodiments relate to a consideration, by the inventors, that a shared radio bearer (RB) can solve a number of problems within the prior art including mitigation of waste of network resources. An example access network architecture that can be used with embodiments is illustrated in FIG. 1A. The illustrated architecture shows a RAN node (e.g. a base station, evolved Node B, (eNB) or next generation NodeB (gNB)). As illustrated, a gNB is logically split into a CU (Central Unit) 105 and at least one DU 110 (Distributed Unit) in the form of star topology. According to embodiments, the CU of the gNB includes a shared PDCP (e.g. a Type 1 PDCP) and each DU of the gNB includes a shared RLC. The shared radio bearer (RB) is mapped onto the radio Layer 2 (L2) of the protocol stacks, which are defined by L2 structure, on both the network side and the UE side for transmission of data of a QoS flow between the network and a UE. According to embodiments, there are provided operational and/or structural configurations of a shared RB.

As used herein, an access node is a radio network node which directly communicates with a UE, to receive data packets from UEs and deliver packets to UEs. An access node may be a DU of a gNB, or a node which is connected to DUs of a gNB. In some embodiments, a gNB (or DUs thereof) can be connected to plural access nodes in an extension of the star topology of FIG. 1A.

Shared radio bearers are implemented partially or fully in the access node. In some embodiments, a shared radio bearer includes a shared RLC process, a shared MAC process, and a shared (partial) PDCP process which interfaces with other per-UE PDCP processes. In other embodiments, a shared radio bearer includes a shared RLC process, a shared MAC process, and a shared PDCP process which performs substantially all PDCP functions.

Shared PDCP (Packet Data Convergence Protocol) entities can be positioned at more central locations such as a Central Unit (CU) in 5G RAN (Radio Access Network) architecture or in a Core Network (CN). Shared RLC and MAC entities can be positioned at CU or DU or other access nodes. In one implementation example, shared PDCP entities are placed in CU of a gNB, and shared RLC and MAC entities are implemented in DUs which are access nodes. In following descriptions, this implementation is assumed, however other implementations are also possible.

In various embodiments, there is provided a method and apparatus for data transmission using a shared radio bearer in order to simplify the operation of RAN access nodes by reducing signalling overhead related to mobility and simplifying per UE RB setup and release operations. In some embodiments, there is provided a method and apparatus that makes UE mobility transparent to access nodes (e.g. network edge cells). In some embodiments, there is provided a method and apparatus for managing the operation of a UE for RB setup and release and making the Layer 2 (L2) operation independent of mobility of the UE (e.g. independent from UE handover).

Solutions are to achieve the objectives above which are separated in to three aspects—i) a shared radio bearer (RB); ii) shared RBs and OTA resource control and iii) shared RBs and management of R-ID (which can be considered substantially synonymous with a UE-ID in RAN) and RAN path management (e.g. downlink (DL) path management).

The shared RB structure is typically implemented at both the network side (access node) and the UE side. That is, the UE is configured to implement a RB structure which performs complementary functions to the shared RB structures on the network side (access node). As such, various embodiments provide for an access node having a shared RB structure, a UE having a corresponding shared RB layer 2 (L2) structure for interfacing with the access node, and a system comprising both the access node and the UE, each having corresponding shared RB structures.

According to embodiments, with a shared radio bearer at the network side, each access node maintains a shared RLC (Radio Link Control) entity for a per-QoS flow, per-slice, across one or more UEs, instead of the current situation where there are RLC entities for each QoS flow of each UE. In other words, one RLC entity can be shared by multiple UEs for one QoS Type traffic of a network slice or network-provided service. With a shared radio bearer at UE side, each UE maintains a RLC entity per QoS flow. According to embodiments, use of a shared RLC entity is applicable to both data radio bearers and signaling radio bearers. A common or slice-specific RLC entity can be shared by all UEs supported by a particular base station (e.g. gNB) or by UEs associated with one slice. A new logical channel may be defined and provided to support shared RBs. An entity, or process or sublayer can refer to hardware, such as signal processing electronics, computer processing components, digital or analog electronic components, or similar hardware, or a combination thereof, which is configured to perform operations such as data (e.g. PDU, SDU) handling and manipulation, as will be readily understood by a worker skilled in the art. The term "slice" refers to a network slice, as it would be readily understood by a worker skilled in the art.

According to embodiments, using a shared radio bearer and OTA resource control, the OTA resource management may be designed for a fixed or variable size of OTA resource to support shared RBs. Whether the OTA resource size is fixed or variable, there are provided protocols for both contention based resource use and contention-free based resource use. In some embodiments, link adaptation may be enabled or a fixed MCS (modulation and coding scheme) may be used.

According to embodiments, using a shared radio bearer and management of R-ID and RAN path management (e.g. DL path management), there may be provided a UE R-ID assignment entity that manages assignment of UE R-IDs, release of the assigned UE R-IDs, or both. The UE R-ID assignment entity may be provided and operated in a per-slice or per-area specific manner, i.e. to assign R-IDs for UEs associated with a given slice or in a given area. In addition, there may be provided a RAN path manager that can determine a set of access node(s) to serve a UE, based on UE DL measurement or UL per UE sounding (or equivalent) reception by the access node.

According to embodiments, a shared RB (e.g. including a shared RLC entity) can be applied in a variety of use cases in which one entity communicates with one or multiple other entities. For example, an access node may communicate with multiple UEs; or a relay node may communicate with multiple other relay nodes; or a vehicle may communicate with multiple other vehicles. According to embodiments, it is assumed that OTA (e.g. the radio interface (Uu)) is used for the communication between entities in the use cases described herein.

As mentioned above, the RAN may employ a CU-DU topology, for example as illustrated in FIG. 1A. This leads to a variety of possible embodiments. In one embodiment, all shared L2 protocol sublayers (e.g. shared PDCP sublayer, shared RLC sublayer, and possibly MAC sublayer) are implemented in the CU of the CU-DU topology. In other embodiments, all shared L2 protocol sublayers are implemented in a user plane function (UPF) of a core network of the wireless communication network, or in a combination of the CU and the UPF. In other embodiments, the shared PDCP sublayer is implemented in the CU and shared RLC sublayer (and possibly MAC sublayer) is implemented in the access nodes (or DU(s)). The shared RLC sublayer (and possibly MAC sublayer) may be implemented, in particular, in those access nodes or DUs which operate Uu interfaces (interface with UEs), wherein the UEs having corresponding shared RB structures. In some embodiments, the shared PDCP sublayer is implemented in the core network and the shared RLC sublayer (and possibly MAC sublayer) are implemented in the access nodes or DUs. For each of these cases, the UEs also implement a corresponding shared RB L2 structure. When the shared RLC sublayer is implemented in the access nodes, mobility operations become transparent to the access nodes.

FIG. 1B illustrates, in a simplified manner, the current structure of L2 at both the RAN node side and the UE side as specified in 3GPP. The detail of the current 3GPP L2 structure will be illustrated below with reference to FIG. 1C. In FIG. 1B, one UE per QoS flow is assumed in order to simplify the illustration. As illustrated in FIG. 1B, at the RAN node side 120, there are provided a PDCP sub-layer 122, a RLC sub-layer 124 and a MAC (Medium Access Control) sub-layer 126 for each UE. There may be provided one RB per QoS flow or UE. The network may issue a C-RNTI for each UE in order to differentiate radio signals from each UE.

FIG. 1C illustrates the current structure of a downlink L2 at the network side per QoS flow/per UE as specified in the 3GPP Technical Specification (TS) document numbered 38.300, "NR; Overall Description; Stage-2" v. 15.2.0 in a more detailed manner. As per 3GPP TS 38.300 v 15.2.0, the layer 2 of New Radio (NR) is split into the following sublayers: Medium Access Control (MAC) 132, Radio Link Control (RLC) 134, Packet Data Convergence Protocol (PDCP) 136 and Service Data Adaptation Protocol (SDAP) 138.

Referring to FIG. 1C, transport channels 142 are offered to the MAC sublayer. The MAC sublayer offers logical channels 144 to the RLC sublayer. The RLC sublayer offers RLC channels 146 to the PDCP sublayer and the PDCP sublayer offers radio bearers 148 to the SDAP sublayer. The radio bearers are categorized into two groups: data radio bearers (DRB) for transmitting user plane data and signalling radio bearers (SRB) for transmitting control plane data. The SDAP sublayer offers QoS flows to 5G Core Network. The MAC sublayer is responsible for operations such as HARQ, UE communications multiplexing, scheduling, and priority handling. The RLC sublayer is responsible for operations such as packet segmentation and ARQ. The PDCP sublayer is responsible for operation such as ROHC and security.

FIGS. 2A and 2B illustrate a simplified version of a shared RB L2 configuration on the network (access node) side of a wireless communication network with Type 1 PDCP and Type 2 PDCP, respectively, in accordance with embodiments. In these figures, it is assumed that the dedicated OTA resource on a per-RB basis, per-slice basis, or both, is available.

For both shared RB L2 structures illustrated in FIGS. 2A and 2B, the shared RLC 210 is responsible for (i) assigning a RLC SDU (Service Data Unit) ID or PDCP PDU (Protocol Data Unit) ID for each PDCP PDU received from the PDCP entity and (ii) performing RLC SDU (PDCP PDU) segmentation or reassembly and (iii) sending RLC ACK/NACK messages. Here, RLC SDU may be packets created or handled by the RLC sublayer and PDCP PDU may be packets created or handled by the PDCP sublayer. Thus, for example, the PDCP PDU may be converted to the RLC SDU when passed from the PDCP entity to the RLC entity.

For both FIGS. 2A and 2B, the size of the physical resources (e.g. OTA resources) between the UE side and the RAN node side may be fixed (e.g. updating or modification thereof can be considered to be slow) or variable. The pre-configured physical resources allocation information may be delivered to UEs using multicast, broadcast or unicast signaling.

Referring to FIG. 2A, the Type 1 PDCP 210 may include the shared PDCP R-ID process 214 and one or more PDCP per-UE processes (e.g. PDCP-other process 211, PDCP-other process 212, PDCP-other process 213). According to embodiments, PDCP R-ID process (e.g. shared PDCP R-ID process 214) is responsible for R-ID header processes; and PDCP per UE processes (e.g. PDCP-other process 211, PDCP-other process 212, PDCP-other process 213) is responsible for each UE's (e.g. UE 241, UE 242, UE 243) security and packet ordering and, optionally, reliability.

On the other hand, referring to FIG. 2B, Type 2 PDCP there is only one shared PDCP entity (e.g. the Type 2 PDCP entity) in the shared RB L2 structure. According to embodiments, the Type 2 PDCP entity 220 is responsible for per service/slice security, and optionally for reliability. Multiple such shared PDCP entities may be provided, for example to support different QoS classes, or communication with different network slices or network services. Similarly, multiple shared RLC entities can be provided. It is noted that a shared RB includes a shared PDCP entity, a shared RLC entity, and MAC entity.

According to embodiments, shared RB design may be specified according to various aspects including the design and protocol formats (e.g. PDCP/RLC header design), actions of corresponding entities (e.g. PDCP/RLC functions), and logical channels which carry RB traffic.

According to embodiments and referring to Type 1 PDCP, first and second PDCP entities may be implemented for functions on a per slice/service/group PDCP basis (i.e. on a per-slice basis, a per-service basis, a per-group basis, or a combination thereof). The first PDCP entity may be an entity configured to perform per UE or per group UE PDCP header processes. According to some embodiments, this entity may be configured according to the current PDCP design specified in 3GPP documents. The entity for the PDCP header process may support various functions such as one or more of: header compression, security (cyphering, integrity), packet re-ordering, retransmission, discarding UP data due to time out and other typical functions performed by the PDCP header process. According to some embodiments, a re-ordering function may be continually activated and not only during HO.

According to embodiments, the above-mentioned second PDCP entity may be an entity for slice/service/group PDCP R-ID processes. This second PDCP entity may be coupled to multiple first PDCP entities and may be a shared process. For transmission (e.g. for each received DL packet of a UE), the slice/service/group PDCP R-ID process may include encapsulating the PDCP PDU received from each (group) UE PDCP process by adding the PDCP header (e.g. adding information such as R-ID), and sending the encapsulated PDCP PDU to relevant access nodes (e.g. holding RLC, RLC with Service Access Points (SAP) carrying R-ID primitives). Per UE security/ordering processes may also be included to perform security and ordering. For reception (e.g. for each received UL PDCP PDU), the slice/service/group PDCP R-ID process may include decapsulating PDCP received from the RLC entity in access node, checking header (e.g. for the R-ID), and sending the post-processed part (e.g. R-ID is removed) of PDCP PDU to the corresponding per (group) UE PDCP process. Per UE security/ordering process may also be included to perform security and ordering processes. The slice/service/group PDCP R-ID process may be only used for Type 1 PDCP, an example of which is illustrated in FIG. 2A.

According to embodiments, an RLC SDU (PDCP PDU) ID may be assigned (e.g. arbitrarily) for each received PDCP PDU (RLC SDU). The assigned RLC SDU ID may be a random number from a random number pool, for example. For each RLC SDU, the RLC layer may support various functions including one or more of the following RLC functions: segmentation, concatenation, RLC PDU reordering (based on RLC SDU ID and segment ID), duplicate detection of RLC PDUs, reassembly of RLC PDUs and RLC PDU discard due to time out.

According to embodiments, the specification of the shared RB may include the design of shared PDCP PDU header. The shared PDCP PDU header may include various fields including one or more of UE ID in RAN (e.g. R-ID), slice/service ID, sequence number (SN) and key related info. According to embodiments, the SN can be a random number. According to embodiments, the UE ID may be the ID for the UE that sends the data and/or the ID for the targeted UE that receives the data. In some embodiments, IDs of both sending and targeted UEs can be included in the header. In some embodiments, the UE ID may be R-ID.

According to embodiments, the specification of the shared RB may include the design of a shared RLC PDU header. The shared RLC PDU header may include various fields including one or more of the slice/service/group ID (or equivalent), UE ID in RAN (e.g. R-ID), packet ID (e.g. RLC SDU ID, PDCP PDU ID), segment ID and description of payload. According to some embodiments, the slice/service/group ID (or equivalent) and UE ID in RAN (e.g. R-ID) may be optional. According to embodiments, the UE ID can be the ID of the UE which creates or sends the data (e.g. source UE), the ID of UE which receives or consumes the data (e.g. target UE) or both. In some embodiments, UE ID may be an R-ID. According to embodiments, the packet ID (e.g. RLC SDU ID, PDCP PDU ID) is a substantially random number selected from a pool of numbers assigned to the slice, group or UEs. According to embodiments, the description of payload field may be indicated in the following manner. Value 00 may indicate no segment (e.g. all bytes are contained), 10 may indicate that the first segment is contained, 01 may indicate that the last segment is contained and 11 may indicate that the middle segment (e.g. neither first nor last segment) is contained.

According to embodiments, dedicated RLC setup may be unnecessary for the shared RB, and the segment ID only identifies a segment of a PDCP PDU. According to some embodiments, the PDCP SN may be reset when PDCP changes and otherwise, the PDCP SN may remain unchanged.

According to the 3GPP document numbered TS 38.300 "NR, Overall Description; Stage 2," v. 15.2.0, one RB is corresponding to a logical channel. In general, the logical channels can be classified into two groups: Control Channels and Traffic Channels.

Control channels are used for the transfer of control plane information only, and include Broadcast Control Channel (BCCH), Paging Control Channel (PCCH), Common Control Channel (CCCH) and Dedicated Control Channel (DCCH). The BCCH is a downlink channel for broadcasting system control information. The PCCH is a downlink channel that transfers paging information, system information change notifications and indications of ongoing public warning system (PWS) broadcasts. The CCCH is a channel for transmitting control information between UEs and network. The CCCH is used for UEs having no RRC connection with the network. The DCCH is a point-to-point bi-directional channel that transmits dedicated control information between a UE and the network and can be used by UEs having an RRC connection.

Traffic channels are used for the transfer of user plane information only. Traffic channels include Dedicated Traffic Channel (DTCH). The DTCH is a point-to-point channel, dedicated to one UE, for the transfer of user information. The DTCH can exist in both the uplink and the downlink.

However, existing logical channels do not specifically support shared RBs. As such, new logical channels supporting the shared RBs may be provided according to embodiments. According to embodiments, the logical channels configured for a shared RB may be provided as additional logical channels. According to embodiments, the logical channels for shared RB may include Slice/service/group Shared Control Channel (S-SCCH) and Slice/service/group Shared Traffic Channel (S-STCH). The S-SCCH is a channel for transmitting control information between UEs and the network. The S-SCCH is used for UEs having RRC connection with the network where the UEs are associated with a slice or service or a group, or the UEs are all UEs served by an access node The S-STCH is a channel for transmitting user traffic between UEs and the network, where the UEs are associated with a slice or service or a group, or the UEs are all UEs served by an access node.

According to embodiments, a shared RBs can be configured for each QoS flow of each slice/service. In some embodiments, PDCP may be configured according to any of the following: (i) NON (e.g. the process may not exist or may not be executed) or; (ii) whether it is shared PDCP or not; (iii) whether it is Type 1 PDCP or type 2 PDCP; (iv) whether PDCP supports ordering or not; (v) whether to send packets with or without compression; and (vi) etc. In another case, RLC may be configured according to any of the following: (i) NON; (ii) whether RLC segments large packets into multiple SDU or not; (iii) whether RLC supports retransmission or not; and (iv) pool size for random number (e.g. the random number for RLC SDU ID). In another case, MAC may be configured for (i) priority and prioritized bit-rate (PBR) for UL and/or (ii) HARQ retransmission.

In some embodiments, in a fixed OTA resources case, OTA resources may be configured for (i) resource description and/or (ii) link adaptation scheme.

Figure 3B:
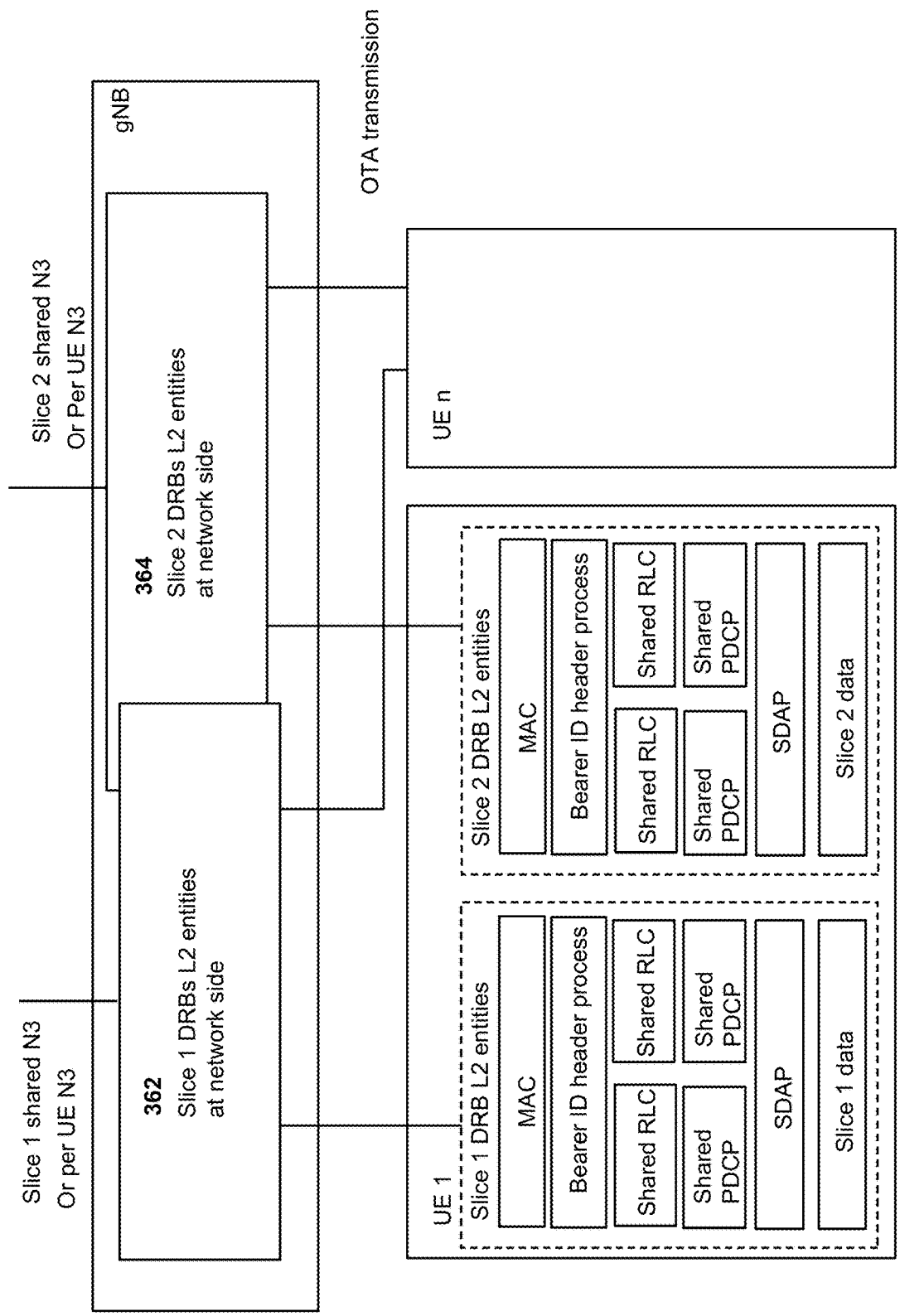
FIG. 3B is a schematic diagram illustrating the shared data radio bearer (DRB) L2 structure at UE side in accordance with embodiments.

FIGS. 3A and 3B illustrate, in a more detailed configuration for the shared data radio bearer (DRB) L2 structure at the network side and at the UE side, respectively, in accordance with embodiments. According to embodiments, the shared data radio bearer (DRB) L2 entities may be per slice/service/group DRB L2 entities. According to embodiments, the DRB L2 structure entities may include MAC, one or more of shared PDCPs (e.g. Type 1 PDCP or Type 2 PDCP), shared RLCs and SDAP. It is also assumed that the dedicated OTA resource is allocated to slice/service/group.

Referring to FIG. 3A, according to embodiments, the per slice/service/group DRB L2 entity 301 may include the MAC 310, the shared RLCs 321, 322 and 323, the shared PDCP 331 and 332, the SDAP 341. The MAC 310 may be configured as a per-slice MAC. One side of the MAC 310 may be connected to the physical layer (not shown in FIG. 3A). Transport channels may couple the physical layer with the MAC 310. The transport channels may be slice/service shared transport channels. The other side of the MAC 310 may be connected to the shared RLC 321. Slice/service shared logical channels may couple the MAC 310 with the shared RLC 321. One example of the slice/service shared logical channels may be Slice/service/group Shared Traffic Channel (S-STCH) discussed elsewhere herein. The shared RLC 321 may support an optional bearer ID header process. For example, if a dedicated resource is assigned to a bearer/QoS flow of a slice, then the Bearer ID field is not required, and additionally the Bearer ID header process is also not needed. The per-Bearer ID (header) process may include, for transmission (e.g. for each received DL packet of a UE), inserting Bearer ID to the RLC partial PDU. For reception (e.g. for each received UL PDCP PDU), the per-Bearer ID (header) process may include removing the Bearer ID field and forwarding the partial RLC PDU to per-bearer process. The shared RLC 321 is connected to other RLCs such as the shared RLCs 322 and 323. Each of the shared RLCs 322 and 323 may be connected to the shared PDCPs 331 and 332, respectively. Shared RLC channels may couple the shared RLCs 322 and 323 with the shared PDCPs 331 and 332. The shared PDCPs 331 and 332 may be Type 1 shared PDCPs or Type 2 shared PDCPs, or a combination thereof. In the case of Type 1 shared PDCPs, per-UE or per-group PDCPs may also be included. Each of the shared PDCPs 331 and 332 may be also connected to the SDAP 341 as illustrated in FIG. 3A. Shared Data Radio Bearers may couple the shared PDCPs with the SDAP 341. The SDAP 341 may support services and functions for per slice/service/group QoS flow handling and optionally may support services and functions for ID mapping between UE ID and R-ID. The SDAP 341 may be connected to other network functions such as UPF via Slice shared N3 tunnel or per UE N3 connection(s).

Referring to FIG. 3B, according to embodiments, per-slice DRB L2 entities at the network side may be connected to the UEs. In FIG. 3B, each of the slice 1 DRB L2 entities 362 and the slice 2 DRB L2 entities 364 at the network side are connected to each of UE 1 and UE n over the air (OTA). In some embodiments, the shared DRB L2 entities at the network side (e.g. the slice 1 DRB L2 entities and the slice 2 DRB L2 entities) may be instantiated in the gNB CU. In some other embodiments, some of the DRB L2 entities may be instantiated in a core network function for some (network) services. The slice 1 DRB L2 entities may be connected to other network functions such as UPF via slice 1 share N3 tunnel or per UE N3 connection(s). Similarly, the slice 2 DRB L2 entities may be connected to other network functions such as UPF via slice 2 share N3 tunnel or per UE N3 connection(s). The overall structure and functions of per slice DRB L2 entities at the UE side can be similar to the structure of per slice DRB L2 entities 301 at the network side. UEs may hold multiple different per-slice DRB L2 entities, as illustrated. In the case of the shared RLC at the UE side (e.g. the shared RLC corresponding to the shared RLC 321 in FIG. 3A), the RLC bearer ID header process may be NON (e.g. the process may not exist or may not be executed) if the bearer dedicated OTA resource is allocated to a slice/service/group.

Figure 3C:
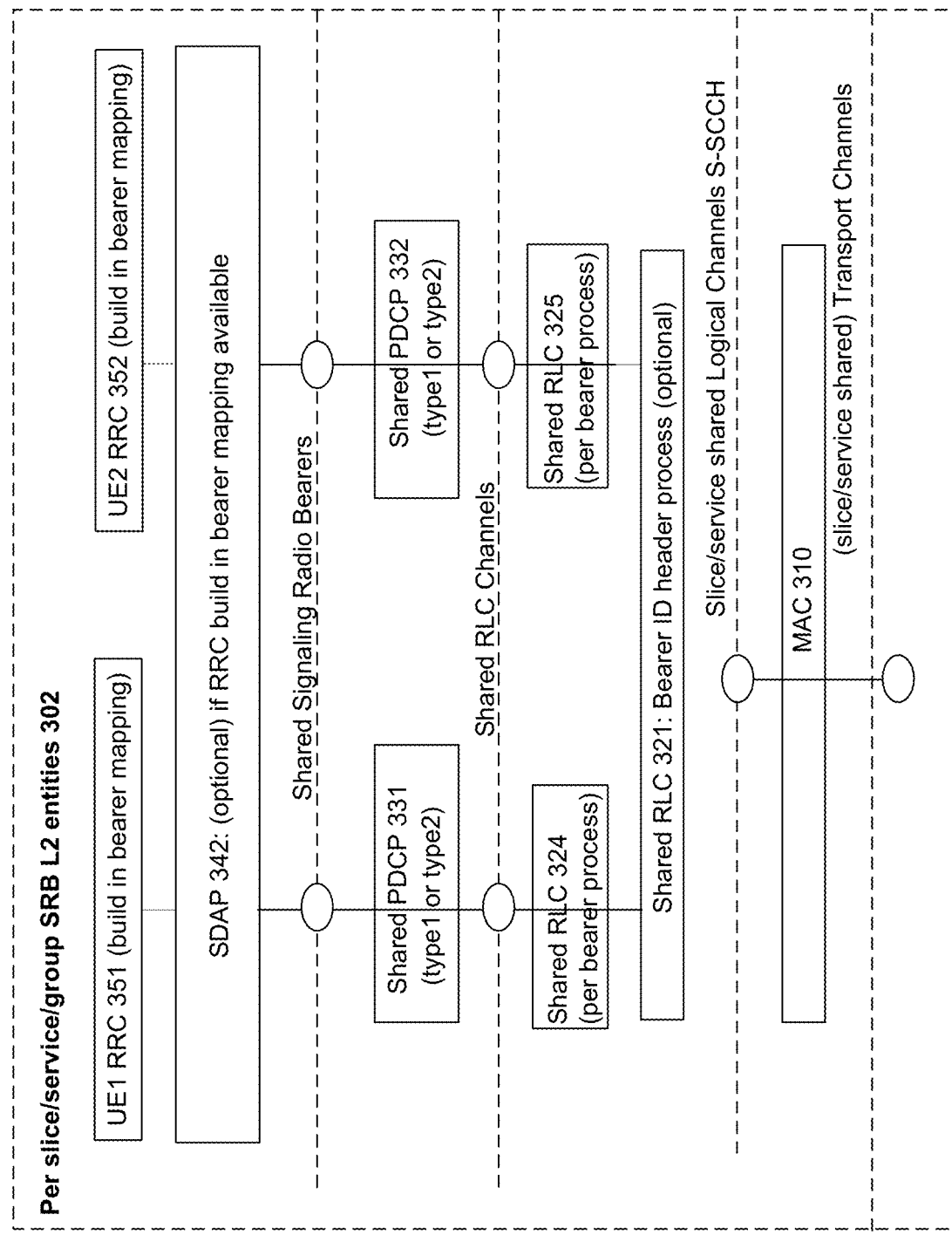
FIG. 3C is a schematic diagram illustrating the shared signaling radio bearer (SRB) L2 structure at network side in accordance with embodiments.
Figure 3D:
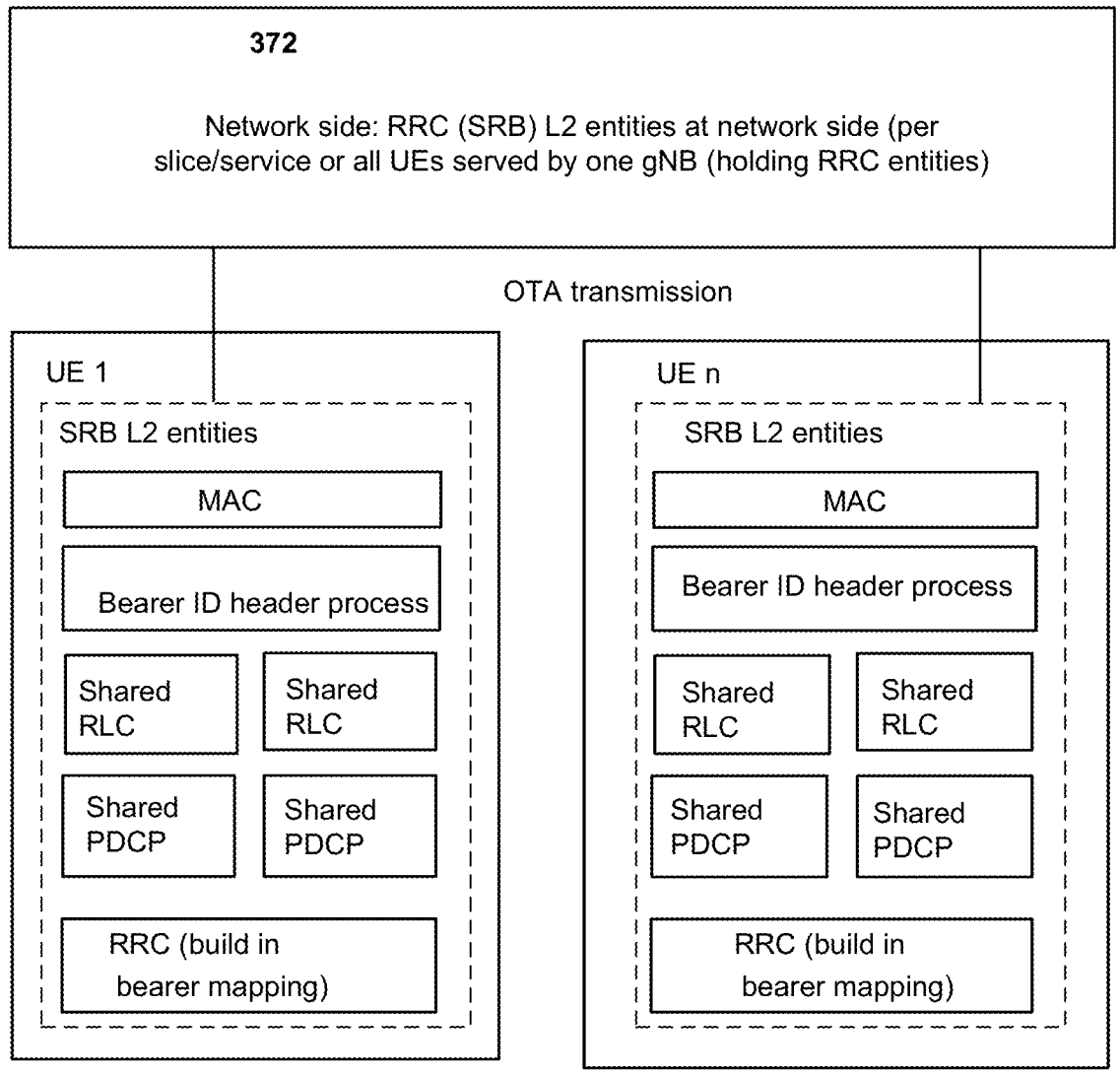
FIG. 3D is a schematic diagram illustrating the shared signaling radio bearer (SRB) L2 structure at UE side in accordance with embodiments.

FIGS. 3C and 3D illustrate, in a more detailed manner, the shared signaling radio bearer (SRB) L2 structure at the network side and at the UE side, respectively, in accordance with embodiments. According to embodiments, the shared signaling radio bearer (SRB) L2 entities may be per slice/service/group SRB L2 entities. According to embodiments, the SRB L2 structure entities may include MAC (e.g. one or more of MAC), shared PDCPs (e.g. Type 1 PDCP or Type 2 PDCP), shared RLCs, SDAP and UE RRCs. In some embodiments, the SRB L2 entities may be shared by all UEs served by a single gNB.

Referring to FIG. 3C, according to embodiments, the per slice/service/group SRB L2 entity 302 may include the MAC 310, the shared RLCs 321, 324 and 325, the shared PDCPs 331 and 332, the SDAP 342, UE1 RRC 351 and UE2 RRC 352. The MAC 310 may be a per-slice MAC. One side of the MAC 310 may be operatively coupled to the physical layer (not shown in the figure). Transport channels may couple the physical layer with the MAC 310. The transport channels may be slice/service shared transport channels. The other side of the MAC 310 may be coupled to the shared RLC 321. Slice/service shared logical channels may couple the MAC 310 with the shared RLC 321. One example of the slice/service shared logical channels may be Slice/service/ group Shared Control Channel (S-SCCH) as disclosed elsewhere herein. The shared RLC 321 may support an optional Bearer ID header process. For example, if a dedicated resource is assigned to a bearer/QoS flow of a slice, then the Bearer ID field is not required and therefore the Bearer ID header process is also not needed. The per-Bearer ID (header) process may include, for transmission (e.g. for each received DL packet of a UE), inserting the Bearer ID to the RLC partial PDU. For reception (e.g. for each received UL PDCP PDU), the per-Bearer ID (header) process may include removing the Bearer ID field and forwarding the partial RLC PDU to per-bearer process. The shared RLC 321 is coupled to other RLCs such as the shared RLCs 324 and 325. The shared RLCs 324 and 325 may support per bearer processes. For transmission (e.g. for each received DL packet of a UE), the RLC per bearer process may include forming a partial RLC PDU which includes payload and sub-headers with the Bearer ID field empty. For reception (e.g. for each received UL PDCP PDU), the RLC per bearer process may include processing the payload based on the sub-header information. Each of the shared RLCs 324 and 325 may be connected to the shared PDCPs 331 and 332, respectively. Shared RLC channels may be placed between the shared RLCs 324 and 325 and the shared PDCPs 331 and 332. The shared PDCPs 331 and 332 may be Type 1 shared PDCP or Type 2 shared PDCP. Each of the shared PDCPs 331 and 332 may be also coupled to the SDAP 342 as shown in FIG. 3C. Shared Data Radio Bearers may couple the shared PDCPs with the SDAP 342. The SDAP 342 may be optional if the RRC is equipped with built-in bearer mapping function. The SDAP 342 may be connected to each of the UE 1 RRC 351 and the UE 2 RRC 352. The UE 1 RRC 351 and the UE 2 RRC 352 may be equipped with bearer mapping function(s) to map RRC signaling messages of a UE to corresponding PDCP 331 and 332.

Referring to FIG. 3D, according to embodiments, RRC/ SRB L2 entities 372 at the network side may be connected to UEs (e.g. UE 1 . . . UE n). In some embodiments, the RRC/SRB L2 entities may be used per slice/service. In some embodiments, the RRC/SRB L2 entities may be shared by all UEs served by a single gNB. The RRC/SRB L2 entities may hold RRC entities as shown in FIG. 3C. In FIG. 3D, the RRC/SRB L2 entities at the network side is connected to each of UE 1 and UE n (and optionally one or more other UEs) over the air (OTA). In some embodiments, the RRC/ SRB L2 entities at the network side may be put in the gNB CU. In some embodiments, RRC/SRB L2 entities may be put in a core network function for some (network) services. According to embodiments, the overall structure and functions of SRB L2 entities at UE side is similar to the structure of the RRC/SRB L2 entities 302 at the network side except that the RRC/SRB entities at the UE side may not necessarily hold SDAP. In case of the shared RLC at the UE side (e.g. the shared RLC corresponding to the shared RLC 321 in FIG. 3C), the RLC Bearer ID header process may be NON (e.g. the process may not exist or not be executed) if the bearer dedicated OTA resource is allocated to slice/service/ group. Similar to the RRC of the per slice/service/group SRB L2 entity 302 in FIG. 3G, the RRCs in UEs (e.g. UE 1 and UE n) may be equipped with bearer mapping function (s).

Embodiments provide for a new design for RLC PDU in various aspects including RLC PDU header format design, RLC status PDU header design for Acknowledged Mode (AM), shared RLC structure and RLC entity handling.

Having regard to RLC PDU header format design, according to the 3GPP TS document numbered 38.322, "NR; Radio Link Control (RLC) protocol specification," v 15.2.0, the currently available RLC PDU header may include the Sequence Number (SN) field to identify a RLC SDU and the Segment Offset (SO) field to identify a segment of a RLC SDU. The SN field may be 6-12 bits in length. The SN field indicates the sequence number of the corresponding RLC SDU. For RLC AM, the sequence number is incremented by one for every RLC SDU. For RLC Unacknowledged Mode (UM), the sequence number is incremented by one for every segmented RLC SDU. The SO (segment offset) field indicates the position of the RLC SDU segment in bytes within the original RLC SDU. Specifically, the SO field indicates the position within the original RLC SDU to which the first byte of the RLC SDU segment in the Data field corresponds. The first byte of the original RLC SDU is referred by the SO field value "0000000000000000" or other numbering that starts at zero.

According to embodiments, the newly provided RLC PDU header may include the RLC SDU ID field and/or the Segmentation ID field. The RLC SDU ID may identify a corresponding RLC SDU. A substantially arbitrary (e.g. random) number (e.g. 6 to 12 bits in length) may be selected as the RLC SDU ID by a sender for each individual RLC SDU to be transmitted. The Segmentation ID may identify a segment of a RLC SDU and may be only used when RLC SDU is segmented. The Segmentation ID may be 2-4 bits in length and the segment number is incremented by one for every segmented RLC SDU, starting from one.

According to embodiments, the new RLC PDU header may optionally include one or more of: a sender ID field, a receptor ID field, a slice ID field and a Qos flow ID field. The sender ID may be an ID assigned by RAN name manager to identify a sender of RLC PDU. R-ID may be used as the sender ID. The sender ID may be 8-16 bits in length. The receptor ID may be an ID assigned by RAN name manager to identify a receptor of RLC PDU. Similar to the sender ID, R-ID may be used as the receptor ID. The receptor ID may be 8-16 bits in length. The sliceID may be an ID to identify a slice/service/group. The slice ID may be 8 bits in length. The QoS flow ID may be an ID to identify the QoS flow. The QoS flow ID may be 3 bits in length.

Having regard to RLC status PDU header design for Acknowledged Mode (AM), according to the 3GPP TS document numbered 38.322, "NR; Radio Link Control (RLC) protocol specification," v 15.2.0, the currently available RLC status PDU header may include the NACK_SN field to indicate a lost RLS SDU and the SOstart field to indicate a lost segment of a RLC SDU. The NACK_SN field may be 12-18 bits (configurable) in length. The NACK_SN field, together with the SOend field (16 bits), indicates the SN of the RLC SDU (or RLC SDU segment) that has been detected as lost at the receiving side of the AM RLC entity. The SOstart field indicates the portion of the RLC SDU with SN=NACK_SN (the NACK_SN for which the SOstart is related to) that has been detected as lost at the receiving side of the AM RLC entity. Specifically, the SOstart field indicates the position of the first byte of the portion of the RLC SDU in bytes within the original RLC SDU. The first byte of the original RLC SDU is referred by the SOstart field value "0000000000000000" or other numbering that starts at zero.

According to embodiments, the newly provided RLC status PDU header may include the RLC SDU ID field and/or the Segmentation ID field. The RLC SDU ID and segment ID jointly indicate RLC SDU segment(s) which are negatively acknowledged; alternatively only RLC SDU ID may identify a corresponding RLC SDU, which is negatively acknowledged. An arbitrary (e.g. random) number (e.g. 6 to 12 bits in length) may be selected as the RLC SDU ID by a sender for each individual RLC SDU to be transmitted. The Segmentation ID may identify a segment of a RLC SDU and may be only used when RLC SDU is segmented. The Segmentation ID may be 2-4 bits in length and the segment number is incremented by one for every segmented RLC SDU, starting from one.

According to embodiments, the new RLC status PDU header may optionally include any of sender ID field, receptor ID field and bearer ID field. QoS flow ID field or RLC channel ID field may be included instead of bearer ID field. The sender ID may be an ID assigned by RAN name manager to identify a sender of RLC PDU. R-ID may be used as the sender ID. The sender ID may be 8-16 bits in length. The receptor ID may be an ID assigned by RAN name manager to identify a receptor of RLC PDU. Similar to the sender ID, R-ID may be used as the receptor ID. The receptor ID may be 8-16 bits in length. The bearer ID (or QoS flow ID or RLC channel ID) may not be included in the header if dedicated OTA resource is available for a specific QoS flow or bearer.

Having regard to shared RLC structure, according to embodiments, the new shared RLC structure provides shared RLC for per bearer process and optional shared RLC for bearer ID (header) process. According to embodiments, the RLC layer may include two types of entities, the shared RLC for per bearer process (e.g. shared RLC 324, 325 in FIG. 3C) and the shared RLC for Bearer ID (header) process (e.g. shared RLC 321 in FIGS. 3A and 3C). In case of the shared RLC for per bearer process, for transmission (e.g. for each received DL packet of a UE), the RLC per bearer process may include forming partial RLC PDU which includes payload and sub-headers with bearer ID field empty. For reception (e.g. for each received UL PDCP PDU), the RLC per bearer process may include processing payload based on the sub-header information. In case of the shared RLC for per Bearer ID (header) process, for transmission (e.g. for each received DL packet of a UE), the RLC per Bearer ID (header) process may include inserting bearer ID to the RLC partial PDU. For reception (e.g. for each received UL PDCP PDU), the RLC per Bearer ID (header) process may include removing bearer ID field and delivering the partial RLC PDU to per-bearer process.

Having regard to RLC entity handling, in accordance with embodiments, there is provided a new RLC entity handing procedure. According to embodiments, new triggering conditions for RLC entity establishment, RLC entity re-establishment and RLC entity release are added in the newly provided procedure. For RLC entity establishment, when upper layers, or a configuration entity which manages the configuration of shared RLC or any other party of a communication, request an RLC entity establishment, the UE or other types of equipment may: establish a RLC entity; set the state variables of the RLC entity to initial values; or a combination thereof. For RLC entity re-establishment, when upper layers, or a configuration entity which manages the configuration of shared RLC or any other party of a communication, request an RLC entity establishment, the UE or other types of equipment may: discard all RLC SDUs, RLC SDU segments, and RLC PDUs, if any; stop and reset all timers; reset all state variables to their initial values; or a combination thereof. For RLC entity release, when upper layers, or a configuration entity which manages the configuration of shared RLC or any other party of a communication, request an RLC entity establishment, the UE or other types of equipment may: discard all RLC SDUs, RLC SDU segments, and RLC PDUs, if any; and release the RLC entity. Furthermore, according to embodiments, RLC entity re-establishment and RLC entity release may not be needed while a UE or other mobile equipment are moving across access nodes, if shared RLC is configured and available.

Embodiments provide for a new design of the PDCP protocol as the architecture of the shared PDCP entities as it is not available in the 3GPP TS document numbered 38.323, "NR; Packet Data Convergence Protocol (PDCP) specification," v 15.2.0. Embodiments also provide a new PDCP header design.

According to the 3GPP TS 38.323 v 15.2.0, the PDCP entities are located in the PDCP sublayer and several PDCP entities may be defined for a single UE. Each PDCP entity is carrying the data of one radio bearer. On the other hand, according to embodiments of the presently disclosed technology, a shared PDCP entity may be defined for one or multiple UEs (applications or any types of mobile equipment). A shared PDCP entity can also be defined for one type of QoS flow and for authorized UEs or different types of equipments which transmit/receive traffic data with the QoS types. In other words, a shared PDCP entity can be defined for one QoS flow of UEs associated with one slice or service.

As mentioned above, a shared PDCP entity according to embodiments may have two types of structures, Type 1 and Type 2.

Type 1 PDCP entity may include a shared PDCP header processor(s) (or entities) and one, two or more per UE PDCP processor(s). According to embodiments, for transmission, the shared PDCP header processor(s) may add R-ID sub-header/header to the partial PDCP PDU from per UE PDCP processor. The Per UE PDCP processor(s) may (further) perform other processes defined by other (current) PDCP entities (e.g. PDCP entities illustrated in the current 3GPP documents). For reception, the shared PDCP header processor(s) may remove R-ID and forward the partial PDCP PDU to per UE PDCP processor. The Per UE PDCP processor(s) may (further) perform other processes defined by other (current) PDCP entities (e.g. PDCP entities illustrated in the current 3GPP documents).

Type 2 PDCP entity may perform the same functions designed for per RB or per UE processor(s); however, the Type 2 PDCP entity may use slice/service/group specific key material. According to embodiments, the Type 2 PDCP entity may be responsible for per service/slice security, and optional reliability.

According to embodiments, the shared PDCP sublayer may be used for (shared) RBs mapped on Slice/service Shared Control Channel (S-SCCH) types of logical channels, or Slice/service shared Channel (S-STCH) type of logical channels.

According to embodiments, one shared PDCP entity may be associated with one shared RB. According to some embodiments, each shared PDCP entity may be associated with one, or multiple shared RLC entities depending on the RB characteristic (e.g. uni-directional/bi-directional or split/non-split) or RLC mode.

Having regard to PDCP header design, in accordance with embodiments there is provided a new design. The newly provided design of PDCP header may include one or more additional fields such as the followings:

S-R-ID (10-16 bits): UE ID (e.g. R-ID) may be used. The S-R-ID may identify a UE whose upper layer data is carried in the PDCP PDU payload to be sent over the air interface.

T-R-ID (10-16 bits): UE ID (e.g. R-ID) may be used. The T-R-ID may identify a UE which is the receptor of a PDCP PDU payload.

Slice/service ID (8 bits): The slice/service ID may identify a slice/service defined.

According to embodiments, the additional fields aforementioned are optional fields.

Figure 4:
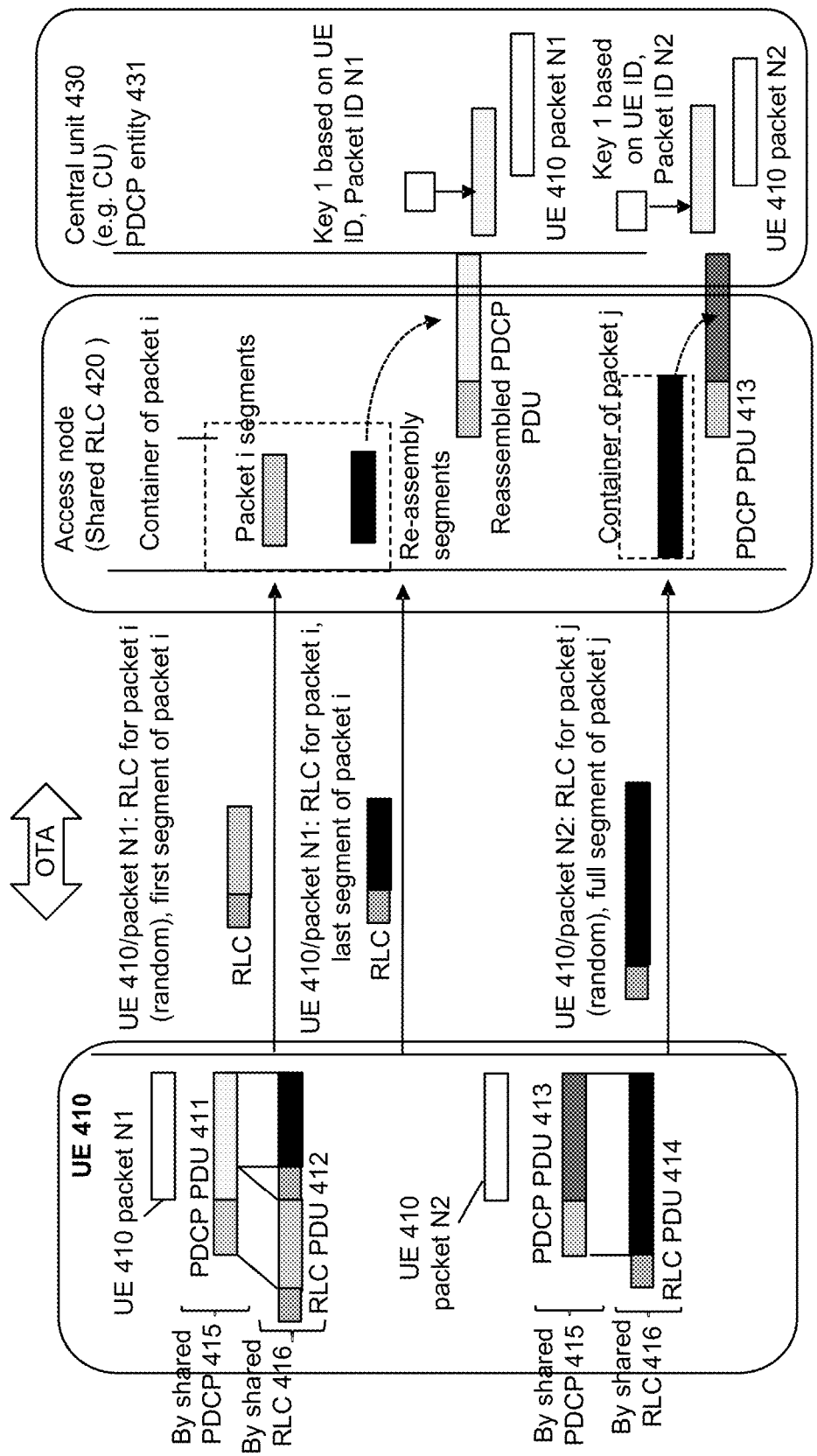
FIG. 4 is a schematic diagram illustrating an operation procedure for data transmission using shared RB when there is one UE transmitting multiple data packets, accordance with embodiments.

FIG. 4 illustrates an operation procedure for data transmission using shared RB when there is one UE transmitting multiple data packets, in accordance with embodiments. Referring to FIG. 4, the UE 410 transmits data packets to the shared RLC 420 at an access node and the shared RLC 420 transmits the received data to the central unit (CU) 430. At the UE side, the UE 410 transmits packet N1 and packet N2 to the access node 420. According to embodiments, the data packet N1 is received by the shared PDCP 415 at UE 410. The data packet N1 may include one IP packet (or PDCP SDU) submitted by IP layer (not shown in FIG. 4). The shared PDCP 415 adds PDCP header to the data packet N1 to create the PDCP PDU 411. The PDCP header and the data packet N1 are encapsulated in the PDCP PDU 411. Then, the PDCP PDU 411 is submitted to the shared RLC 416. The shared PDCP 411 forms a PDCP PDU, e.g. by adding a header. The shared RLC 412 segments the PDCP PDU, e.g. to form the RLC PDU 412 (e.g. comprising plural SDUs).

According to embodiments, the shared RLC 416 assigns an ID (e.g. a random number) to the PDCP PDU 411 to create the RLC PDU 412. The PDCP PDU 411 may be segmented into pieces due to one or more factors such as large size of the PDCP PDU 411 and/or low radio data transmission rate. The assigned IDs and segments of the PDCP PDU 411 are encapsulated in the RLC PDU 412 as depicted in FIG. 4. Then, the segments of the RLC PDU 412 are transmitted to the shared RLC 420 at access node, over the air, as depicted in FIG. 4. Although FIG. 4 shows only the first and last segments of the RLC PDU 412, there may be more than two segments of the RLC PDU 412, and all the segments will be transmitted to the RLC PDU 412. Each RLC PDU segment may include RLC header and the segment of the PDCP PDU 411.

When the shared RLC 420 at access node receives the segments of the RLC PDU 412, it may decapsulate the RLC PDU 412 and retrieve the segments of the PDCP PDU 411. When decapsulating, verification process may be operated, for example by checking header (e.g. checking R-ID). Then, the shared RLC 420 puts all segments of the PDCP PDU 411 into a container (e.g. the container of packet i) and performs reassembly based on PDCP PDU ID and segments ID. Then, the shared RLC 420 sends PDCP PDU 411 to shared PDCP entity 431 (per QoS). The content of the reassembled PDCP PDU may be identical to that of the PDCP PDU 411 at UE side.

When the shared PDCP entity 431 at CU 430 receives the reassembled PDCP PDU, it performs corresponding PDCP layer process based on PDCP header information. The PDCP header may be removed from the reassembled PDCP PDU; and the output data packet (e.g. reassembled PDCP PDU minus PDCP header) may be sent to the shared PDCP entity 431 at CU 430. Then, the shared PDCP entity 431 may retrieve the data packet N1 from the received output data packet (e.g. reassembled PDCP PDU minus PDCP header). In some embodiments, per UE security/ordering process may be included. The shared PDCP entity 431 may perform per UE security process using security key or authentication key (e.g. key 1 in FIG. 4) based on UE ID when the shared PDCP entity 431 retrieves the data packet N1.

According to embodiments, transmission of the data packet N2 is performed using the procedures described above except the segmentation part. The data packet N2 is received by the shared PDCP 415 at UE 410. The data packet N1 may be IP packets (or PDCP SDUs) submitted by IP layer (not shown in FIG. 4). The shared PDCP 415 adds PDCP header to the data packet N2 to create the PDCP PDU 413. The PDCP header and the data packet N2 are encapsulated in the PDCP PDU 413. Then, the PDCP PDU is submitted to the shared RLC 416.

According to embodiments, the shared RLC 416 assigns an ID (e.g. a random number) to the PDCP PDU 413 to create the RLC PDU 414. Then, the assigned ID and the full segment of the PDCP PDU 413 are encapsulated in the RLC PDU 414 as depicted in FIG. 4. The RLC PDU 414 is transmitted to the shared RLC 420 at access node, over the air, as depicted in FIG. 4. When the shared RLC 420 at access node receives the segments of the RLC PDU 414, it may decapsulate the RLC PDU 414 and retrieve the full segment of the PDCP PDU 413. When decapsulating, verification process may be operated, for example by checking header (e.g. checking R-ID). Then, the shared RLC 420 puts the full segment of the PDCP PDU 413 into a container (e.g. the container of packet j). The reassembly process is not needed as the PDCP PDU 413 was not segmented. Then, the shared RLC 420 sends PDCP PDU 413 to shared PDCP entity 431 (per QoS).

When the shared PDCP entity 431 at CU 430 receives the PDCP PDU 413, it performs corresponding PDCP layer process based on PDCP header information. The PDCP header may be removed from the PDCP PDU 413; and the output data packet (e.g. PDCP PDU 413 minus PDCP header) may be sent to the shared PDCP entity 431 at CU 430. Then, the shared PDCP entity 431 may retrieve the data packet N2 from the received output data packet (e.g. PDCP PDU 413 minus PDCP header). In some embodiments, per UE security/ordering process may be included. The shared PDCP entity 431 may perform per UE security process using security key or authentication key (e.g. key 1 in FIG. 4) based on UE ID when the shared PDCP entity 431 retrieves the data packet N2.

In some embodiments, and in summary, the UE creates PDCP PDUs using a PDCP process, creates RLC PDU(s), including optional packet segmentation, and transmits the packet segments. The access node receives the packet segments and passes them to a shared RLC entity, which collects segments belonging to common packets together and re-assembles the segments to form a PDCP PDU. The shared PDCP entity will handle the PDCP PDUs based on the header information, which may include an assigned UE ID and Packet ID.

According to embodiments, similar operation procedures will occur at access node for DL data transmission.

Figure 5:
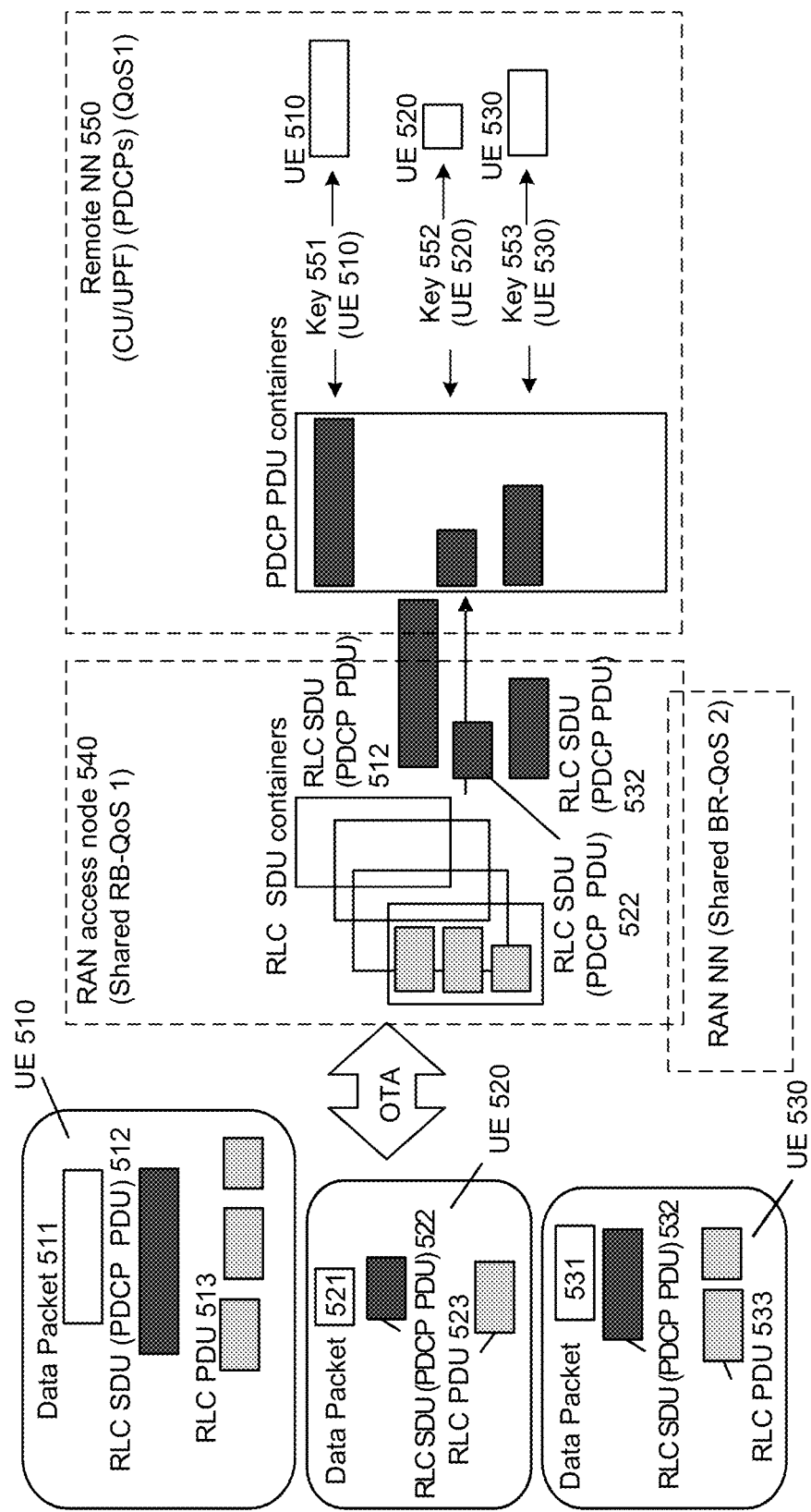
FIG. 5 is a schematic diagram illustrating an operation procedure for data transmission using shared RB when there are multiple UEs transmitting data packets, accordance with embodiments.

FIG. 5 illustrates an operation procedure for data transmission using a shared RB when there are multiple UEs transmitting data packets, in accordance with embodiments. According to embodiments, the operational procedures for data packets transmission by multiple UEs may be similar to the operational procedures for data packets transmission by a single UE.

Referring to FIG. 5, the UEs 510, 520 and 530 are transmitting data packets to the RAN access node 540 (shared RB for QoS 1) and the RAN access node 520 is transmitting the received data packets to the remote network nodes 550 (CU/UPF, PDCP entities for QoS 1). The RAN access node 540 includes RLC SDU containers. The remote network node 550 includes one or more PDCP PDU containers.

Referring to FIG. 5, the UE 510 initially contains the data packet 511, UE 520 contains the data packet 521 and UE 530 contains the data packet 531. Through the aforementioned procedure for encapsulating PDCP header and data packet, the UEs 510, 520 and 530 will create the RLC SDU (PDCP PDU) 512, 522 and 532, respectively. Then, through the aforementioned procedure for creating RLC PDU, the UEs 510, 520 and 530 will create the RLC PDU 513, 523 and 533, respectively. As shown in FIG. 5, the RLC PDU 513 and 533 are segmented into pieces. The RLC PDU 523 is not segmented, by way of example. For each segment of the RLC PDUs 513 and 533 and the full segment of the RLC PDU 523, an ID (e.g. a random number) may be assigned.

Using the aforementioned procedure for transmitting data packets, each segments of the RLC PDUs 513 and 533 and the full segment of the RLC PDU 523 are transmitted to the RAN access node 540. Further, using the aforementioned procedure for decapsulating the RLC PDU, the RAN access node 540 retrieves the all segments of the PDCP PDUs 512 and 532, and the full segment of the PDCP PDU 522. All segments of each of PDCP PDUs 512, 522 and 532 will be contained RLC SDU containers. Then, each PDCP PDU will be reassembled based on PDCP PDU ID and segments ID. The PDCP PDU 522 does not need reassembly process as it was not segmented. The reassembled PDCP PDUs 512 and 532 and the PDCP PDU 522 will be sent to the PDCP PDU containers. The PDCP PDU containers may be included in the remote network node 550 (e.g. PDCP PDU entity). Each container may contain all PDCP PDUs of all UEs for the same QoS flow (e.g. QoS 1). The actions at the access node are performed by a shared RB, including a shared RLC process and a shared PDCP process.

With the PDCP PDUs in the PDCP PDU container, the remote network node 550 (e.g. PDCP PDU entity) will perform corresponding PDCP layer process based on PDCP header information and will retrieve the data packets 511, 512 and 513. In some embodiments, a per-UE security process may be part of the PDCP layer process. The remote network node 550 (e.g. PDCP PDU entity) may perform the per-UE security process using an appropriate security key. The security key may exist for each of UEs 510, 520 and 530. Referring to FIG. 5, the data packet 511 will be retrieved using the key 551; the data packet 521 will be retrieved using the key 552; and the data packet 531 will be retrieved using the key 553.

According to embodiments, the shared PDCP performs a number of functions. In the case of Type 1 PDCP, this includes a UE ID (e.g. R-ID) process and a per-UE (or QoS flow) PDCP process. The UE ID (R-ID) process of the Type 1 PDCP may check UE-ID (e.g. R-ID) and send the PDCP PDU to the corresponding per-UE (or QoS flow) PDCP process associated with that UE-ID. The per-UE (or QoS flow) PDCP process may perform a per-UE (or QoS flow) security process and check sequence numbers (SNs) for possible triggering of retransmission procedures. In case of Type 2 PDCP, the Type 2 PDCP may perform per service/slice security. In support of this, Type 2 PDCP may use per slice/service key materials.

According to embodiments, the shared RB L2 structure and protocol stack design illustrated above may have one or more technical benefits/advantages such as the followings:

- The shared L2 structure and protocol stack design may be made independent of any particular physical/virtual entities. Also, it can be applied in any entities which communicate with multiple other entities. For example, the shared L2 structure and protocol stack design can be implemented at RAN edge cells and UEs; or can be implemented in relay node and its children relay/access nodes, etc.
- Possibly no UE specific context needs to be maintained at access nodes.
- There may be no need for RLC/MAC setup/release at serving and target for each individual UE.
- There may be no need for R-ID reassignment within a RAN zone.
- Mobility of UE (at all RRC state) may be transparent to access nodes (cells).
- UE may be aware of serving cell (whether it is changed or not) only on Layer 1 (L1); no additional L2 action is necessarily required if PDCP remains unchanged.
- UE may be aware of serving cell only on L1; no additional L2 action is required if PDCP migration (e.g. context transfer) enabled.
- The shared L2 structure and protocol stack design may allow UEs to dynamically join RBs with limited or no initial signaling to establish a connected state.
- Signaling overhead related to RBs can be potentially reduced.
- The notion of this shared L2 structure and protocol stack design can potentially be used for UEs in all RRC state.

According to embodiments, shared RB (L2 structure) is completely independent from OTA (L1) resource use. However, OTA resource management design, together with shared RBs, can further simplify OTA operation. According to embodiments, shared RB protocol stack design and the flexible OTA resource allocation make the OTA interface design significantly flexible and enable the support of various service types using slice, service and/or group concept. This may apply to UEs in all RRC states. The protocol(s) for OTA resource management will be discussed below in terms of OTA resource allocation and OTA resource usage.

Having regard to OTA resource allocation, when the size of OTA resource and MCS (modulation and coding scheme) are fixed or varied slowly, information regarding the resource allocation and MCS may be sent to relevant UEs. According to embodiments, information may be sent to relevant UEs over the network (e.g. OTA) using broadcast, multicast or unicast. Per-transmission resource allocation signaling may not be required. On the other hand, when the size of OTA resource and/or MCS is variable, a control signaling may be needed for each DL/UL transmission in order to indicate the resource allocation and MCS for that DL/UL transmission.

As previously mentioned, OTA resource usage can be contention-free or contention-based. Having regard to OTA resource usage, when the size of OTA resource and MCS (modulation and coding scheme) are fixed or modified slowly, per-transmission (OTA resource) assignment signaling may not be needed if (OTA) resource use is contention/multicast (MC) based. However, if (OTA) resource usage is contention-free, per-transmission assignment signaling and an optional resource description (e.g. resource size, MCS) may be used. In some embodiments, UE R-ID may be included in per-transmission assignment signal. On the other hand, when the size of OTA resource and/or MCS is variable, per-transmission (OTA resource) assignment signaling may be used when (OTA) resource use is contention/multicast (MC) based. In some embodiments, the resource description (e.g. resource size, MCS (optional)) may be included in the signal. However, if (OTA) resource usage is contention-free based, the protocol for per-transmission assignment signaling may be same as that for the current 3G/4G networks. According to embodiments, one or more of UE R-ID, resource description (e.g. resource size) and optional MCS may be included in the per-transmission assignment signal.

According to embodiments, when link adaptation is enabled or supported, whether the OTA resource size is fixed or variable, the currently available protocol(s) for OTA resource management in 3G/4G network can be used, but UE R-ID may need to be used.

Below is further detailed descriptions provided with respect to OTA resource management in accordance with embodiments.

When the size of OTA resource and MCS (modulation and coding scheme) are fixed or modified slowly, for UL communications, OTA resource may be assigned to a service/group with detailed description of resource allocation via broadcast, multicast or unicast signaling. The description of resource allocation may include service/slice specific sequence code. The use of UL shared resource may be classified into two cases, contention based resource use and contention-free based resource use. In case of contention based resource use, each UE use service/slice specific sequence code either for resource request or for direct data transmission. In case of contention-free resource use, a short indication signaling may be used to facilitate transmission. The short indication signaling may include UE R-ID or same scheme of current RACH procedure. A UE can determine whether or not to transmit based on the indication signaling. It may also include MCS without resource description. If resource size is possibly variable, the short indication signaling may need to indicate the resource size and RLC SDU id. Indication of RLC SDU id may be optional.

According to embodiments, actions of UE and/or access nodes (e.g. gNB) for UL communications can be illustrated as follows. In case of contention based resource use, any UE may send RLC PDU (e.g. MAC Transport Blocks (TBs)) on the shared resource, and network nodes (e.g. gNB) may use RLC SDU (PDCP PDU) ID for ACK/NACK, Timing Advance (TA) etc. In case of contention-free based resource use, the pulled UE may send MAC TBs on the shared resource, and network nodes (e.g. gNB) may use RLC SDU ID for ACK/NACK, TA and etc. The pulled UE may be indicated by UE R-ID or physical resource ID used for the UL request sent by the UE. For both contention based and contention-free based resource use, any devices (e.g. UEs) may be allowed to dynamically join the shared (radio) bearer. As used here, a "pulled" UE is one to which the shared resource has been assigned by the network, based on the UL resource request(s) indication from UE(s). This renders the subsequent transmission contention-free when the shared resource is assigned only to the pulled UE.

For DL communications, a given OTA resource may be assigned to a slice, service, and/or group with detailed resource allocation description (e.g. resource size and MCS). Use of the OTA resource can be classified into two scenarios—shared-use and dedicated-use. Shared-use may be adopted where there is no per-UE assignment signaling is needed. On the other hand, dedicated-use may be adopted where a short indication signaling (e.g. device ID, R-ID, (optional) MCS) is used to indicate which UE is to use a given resource at a given time.

According to embodiments, actions of UE and/or access nodes (e.g. gNB) for DL communications can be illustrated as follows. For shared-use of OTA resources, all UEs may need to decode transport blocks (TBs) on the shared resource and use R-ID to determine whether to continue the process or not. The targeted UE may use RLC SDU (PDCP PDU) ID for ACK/NACK segments of a PDCP PDU, if configured. For dedicated-use of OTA resources, network nodes (e.g. gNB) may send transport blocks (TBs) on the shared resource. Only the targeted UE may decode TBs and use RLC SDU (PDCP PDU) ID for ACK/NACK, if configured. For both shared-use and dedicated-use of OTA resources, any devices (e.g. UEs) may be allowed to dynamically join the shared (radio) bearer.

When the size of OTA resource and/or MCS is variable, for UL communications, OTA resource assignment may be needed at per transmission with detailed resource allocation description (e.g. UE R-ID or service/group ID, resource size, MCS), service/slice sequence code or equivalent.

According to embodiments, actions of UE and/or access nodes (e.g. gNB) for UL communications can be illustrated as follows. In case of contention based resource use, any UE may send RLC PDU (e.g. MAC Transport Blocks (TBs)) on the shared resource, and network nodes (e.g. gNB) may use RLC SDU (PDCP PDU) ID for ACK/NACK and Timing Advance (TA). In case of contention-free based resource use, the pulled UE may send MAC TBs on the shared resource, and network nodes (e.g. gNB) may use RLC SDU ID for ACK/NACK, TA and etc. The pulled UE may be indicated by UE R-ID or physical resource ID used for the UL request sent by the UE. For both contention based and contention-free based resource use, any UEs may be allowed to dynamically join the shared (radio) bearer.

For DL communications, OTA resource assignment may be performed at per transmission (e.g. on a per-transmission basis) with detailed resource allocation description (e.g. UE R-ID or service/group ID, resource size, MCS).

According to embodiments, actions of UE and/or access nodes (e.g. gNB) for DL communications can be illustrated as follows. For shared-use of OTA resources, all UEs may need to decode transport blocks (TBs) on the shared resource and use R-ID to determine whether to continue the process or not. The targeted UE may use RLC SDU (PDCP PDU) ID for ACK/NACK segments of a PDCP PDU, if configured. For dedicated-use of OTA resources, network nodes (e.g. gNB) may send transport blocks (TBs) on the shared resource. Only the targeted UE may decode TBs and use RLC SDU (PDCP PDU) ID for ACK/NACK, if configured.

Following is one example of UL data transmission for a UE in RRC_CONNECTED state in accordance with embodiments. For each slice, service or group, the logical connection between RLC at an access node and PDCP at CU on network is assumed to have been setup. For each slice, service or group, the OTA resource is assumed to have been assigned (e.g. sequence). While in movement, the UE and path manager interact for serving access node(s) indication (NAS/RRC) by the RAN path manager. This procedure may be transparent to the serving cell. The UE sends data to the assigned serving cell. The serving cell receives the UL RLC PDU(s) and sends the PDCP PDU to the slice shared PDCP entity.

Following is one example of UL data transmission for a UE in RRC_INACTIVE state in accordance with embodiments. For each slice, service or group, the logical connection between RLC at an access node and PDCP at CU on network is assumed to have been setup. For each slice, service or group, the OTA resource is assumed to have been assigned (e.g. sequence). A UE sends data of a slice using the slice resource. An access node, after possible reassembly of RLC PDUs, forward PDCP packet to the slice corresponding PDCP entity. The access node does not need to be aware of the UE's ID, and does not need to find the anchor of the UE because of the shared RB design and pre-configured UL resource for a slice/service/group and logical connection between the RLC to the slice/service/group PDCP entities.

Following is one example of UL data transmission for a UE in RRC_IDLE state in accordance with embodiments. For each slice, service or group, the logical connection between RLC at an access node and PDCP at CU on network is assumed to have been setup. For each slice, service or group, the OTA resource is assumed to have been assigned (e.g. sequence). For each slice, service or group, per slice/slice/group security is assumed to have been implemented. For example, per slice key materials are assumed to be available and applied to all UEs of the slice. A UE simply sends data of a slice using the slice resource. An access node, after possible reassembly of RLC PDUs, forward PDCP packet to the slice corresponding PDCP entity. The access node does not need to be aware of the UE's ID, does not need to find the anchor of the UE because of the shared RB design and pre-configured UL resource for a slice/service/group and logical connection between the RLC to the slice/service/group PDCP entities.

Figure 6:
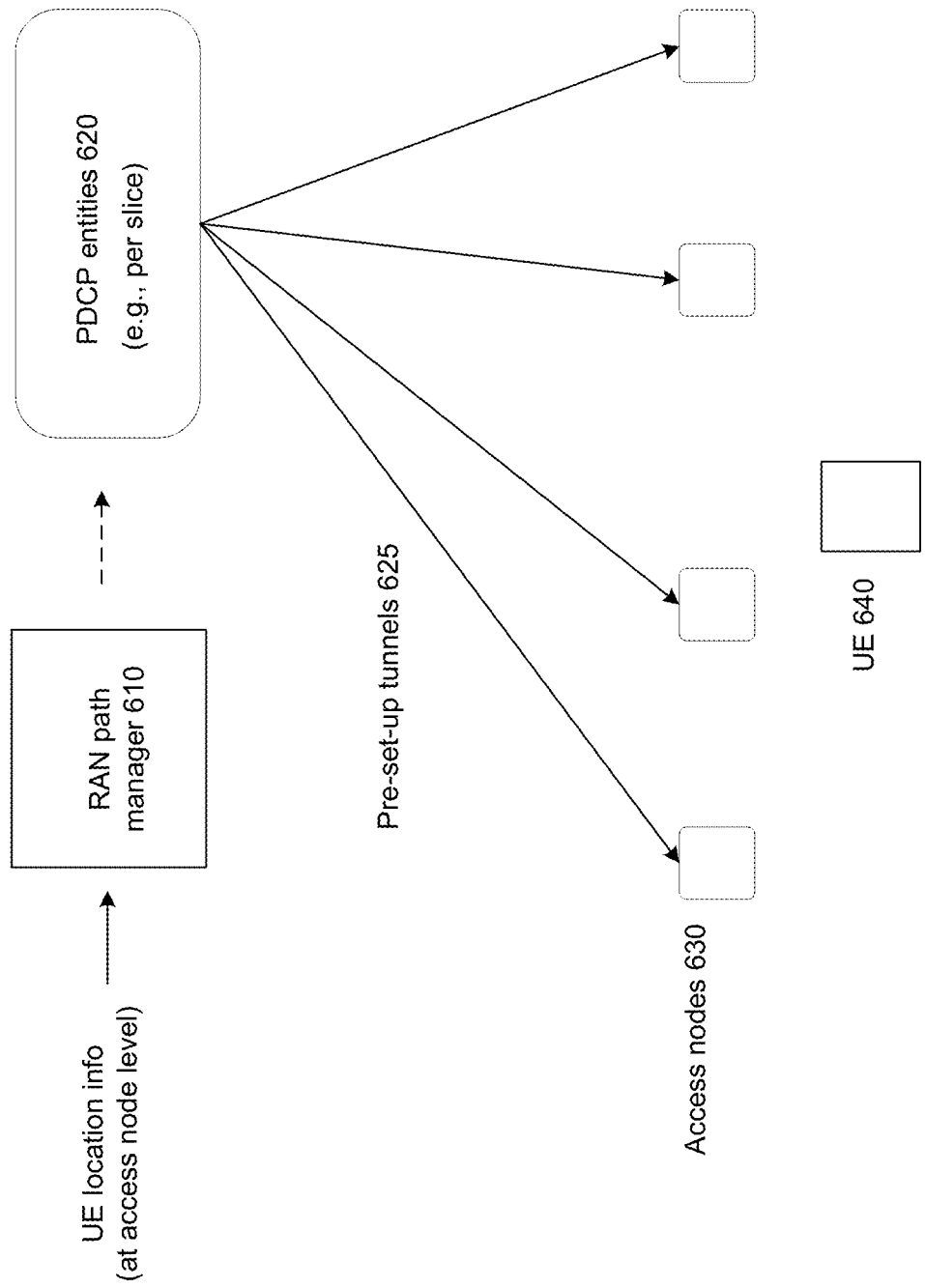
FIG. 6 is a schematic diagram illustrating operations of network entities for RAN (Radio Access Network) path management in accordance with embodiments.

FIG. 6 illustrates operations of network entities for RAN path management in accordance with embodiments. The RAN path management for DL transmission will be illustrated for different RRC states of the UE (e.g. RRC_CONNECTED, RRC_INACTIVE, RRC_IDLE) with reference to FIG. 6.

According to embodiments, when the UE 640 is in RRC_CONNECTED state (e.g. when RRC connection is established for data transmission to the UE 640), the RAN path manager 610 may receive location information of the UE 640 (e.g. DL measurement reports from the UE 640 or UL sounding/sequence reception strength from the access nodes 630). The RAN path manager 610 may also determine which one of the access nodes 630 can forward DL data to the UE 640 and inform an entity which holds PDCPs (e.g. PDCP entity 620). The PDCP entity 620 may create PDCP PDU(s) and send them to the corresponding access nodes (e.g. the access node 630) via tunnels. The tunnels between the PDCP entity 620 and the access nodes 630 may be the pre-set-up tunnels 625. The PDCP entity may include R-ID primitive in SAP (serving access point between PDCP/RLC). According to embodiments, HO procedure or multi-cell transmission may be transparent to the access node(s) 630.

When the UE 640 is in RRC_INACTIVE state, the RAN path manager 610 for DL may receive location information of the UE 640 (after response to paging or location update of the UE 640). The RAN path manager 610 may also determine which one of the access nodes 630 can forward DL data to the UE 640 and inform an entity which holds PDCPs (e.g. PDCP entity 620). The PDCP entity 620 may create PDCP PDU(s) and send them to the corresponding access nodes (e.g. the access node 630) via tunnels. The tunnels between the PDCP entity 620 and the access nodes 630 may be the pre-set-up tunnels 625. The PDCP entity may include R-ID primitive in SAP (serving access point between PDCP/RLC). According to embodiments, the mobility of the UE 640 is transparent to the serving access node(s) (e.g. one of the access nodes 630).

When the UE 640 is in RRC_IDLE state, the RAN path manager 610 for DL may receive location information of the UE 640 (after response to paging or location update of a UE). The RAN path manager 610 may also determine which one of the access nodes 630 can forward DL data to the UE 640 and inform entity which holds traffic packets (slice/service shared PDCP). One per slice security processor performs the protection of the packet(s) (for shared key case). The PDCP entity 620 may create PDCP PDU(s) and sends them to the corresponding access nodes e.g. the access node 630) via tunnels. The tunnels between the PDCP entity 620 and the access nodes 630 may be the pre-set-up tunnels 625. The PDCP entity 620 may include R-ID primitive in SAP (serving access point between PDCP/RLC). According to embodiments, the mobility of the UE 640 is transparent to the serving access node(s) (e.g. one of the access nodes 630).

According to embodiments, for UL transmission, RAN path may be managed similarly regardless of the UE's RRC state (e.g. whether the UE 640 is in RRC_CONNECTED, RRC_INACTIVE or RRC_IDLE state). In some embodiments, all received data from a slice-specific resource may be forwarded to slice PDCP entities (e.g. PDCP entity 620). In some other embodiments, RLC header with slice ID may be used for forwarding to slice specific PDCP entity (e.g. PDCP entity 620)

According to embodiments, through RAN path management, interaction between serving and target access cells can be avoided. Also, DL packet path management can be controlled through RAN path management. These are factors to consider when simplifying the network operations related to mobility.

Path management can also include performing path management for a service with multicast/broadcast data delivery characteristics.

To manage the paging area or DL transmission serving set for multicast, the path manager may be configured to obtain and maintain UE ID list for each slice which support DL multicast/broadcast service. The path manager, based on location information provided by LT entity and service mode (unicast, multicast, broadcast), determines the serving sets for a service. A serving access node set for a multi/broadcast service includes access nodes which communicate with UEs that belong to a multicast/broadcast services and are currently within the coverage of these nodes.

In addition to path management on a per-UE basis, a path manager may also perform path management for a group of UEs receiving a multicast service or a broadcast service. In this case, the path manager determines the access node set for the group of UEs. Path management for groups of UEs proceeds similarly to path management for individual UEs.

Figure 7:
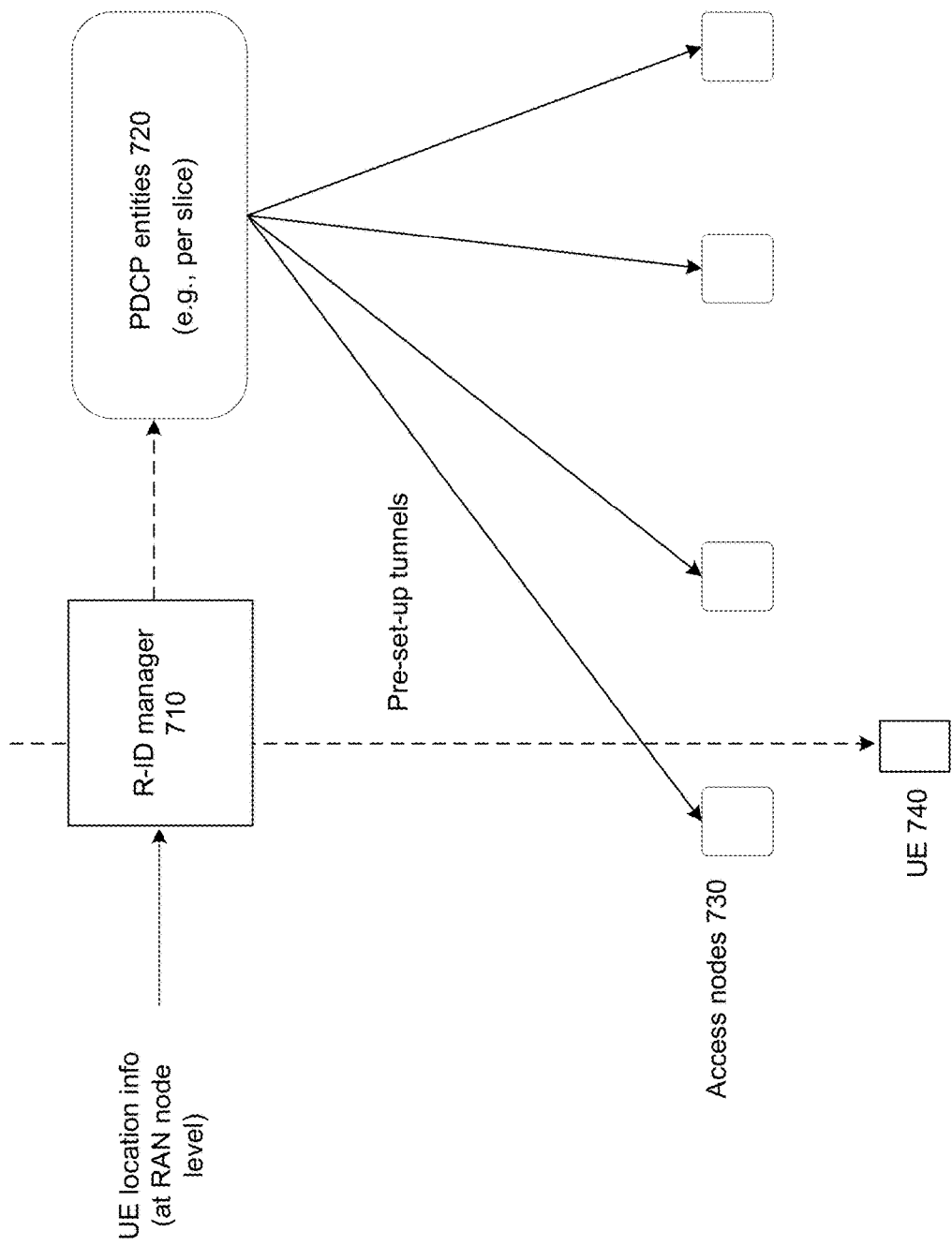
FIG. 7 is a schematic diagram illustrating operations of network entities for UE R-ID (Radio-ID) management in accordance with embodiments.

FIG. 7 illustrates operations of network entities for UE R-ID management in accordance with embodiments.

According to embodiments, the R-ID manager 710 may be independent of any physical cell and associated with multiple access nodes (e.g. access nodes 730). The access node name list (e.g. RAN-Zone) may be maintained. In some embodiments, multiple gNBs name list may be maintained. For each of slice/service, a R-ID pool is maintained. According to embodiments, the R-ID manager 710 can manage R-ID for one or multiple slices/services/groups. When the UE 740 moves into any of access nodes in the list (e.g. any of the access nodes 730), a R-ID is assigned to the UE 740 for a slice. When the UE 740 moves out of all of access nodes in the list (e.g. none of the access nodes 730), used R-ID may be released to the UE 740. According to embodiments, the assigned R-ID need to be informed to corresponding slice/service PDCPs (e.g. PDCP entities 720). The assigned R-ID may need to be informed to the UE 740.

According to embodiments, HO procedure or multi-cell transmission may be transparent to the access node(s) 730.

According to embodiments, the UE R-ID manager 710 may assign R-ID to a UE (e.g. UE 740) and ensure that the UE keeps this ID unchanged within a certain geographic area or crossing multiple cells. The size of the area may be service specific, slice specific or UE specific. In some embodiments, the size of the area may depend on UE state (RAN/CN).

According to embodiments, R-ID may be unique within an area. In some embodiments, R-ID may be unique within a slice and within an area. According to embodiments, R-ID may be used for UE specific PDCP or optional OTA resource assignment using indication/link adaptation.

It is noted that the R-ID management may be performed on a per-slice basis, on a per-geographic-area basis, or a combination thereof. In various embodiments, an important responsibility of the R-ID manager is to assign a UE R-ID to uniquely identify a UE within a geographic area, or within a slice, or both.

According to embodiments, through R-ID management scheme, R-ID change may be avoided while UE moves between access nodes belonging to one RAN-zone, since the R-ID is not assigned by each access cell. Through R-ID management scheme, signaling for R-ID assignment and related latency may be reduced. These are key factors to consider when simplifying processes related to mobility.

Figure 8:
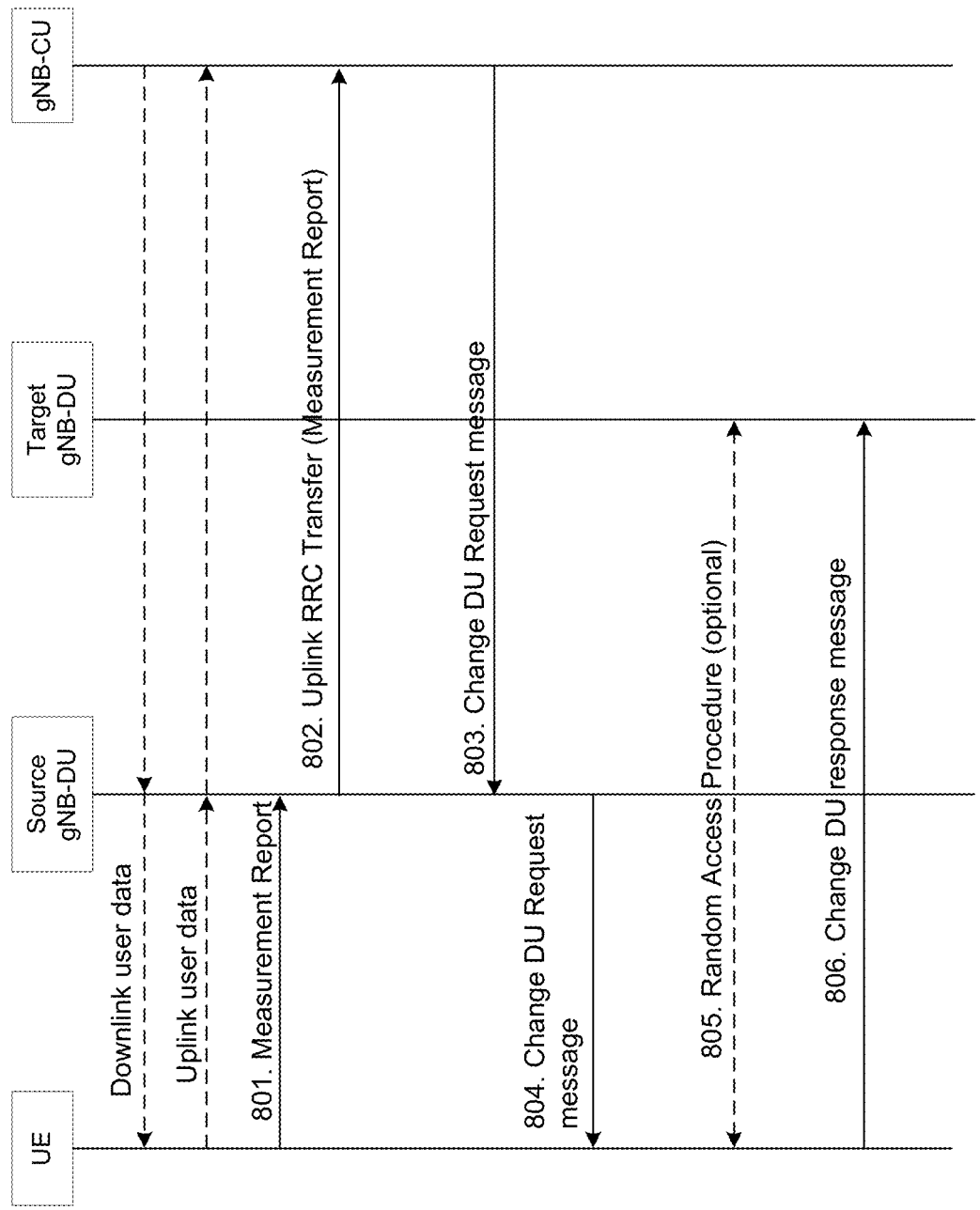
FIG. 8 is a flow diagram illustrating a procedure for (shared) RB management during handover in NR operation, accordance with embodiments.

FIG. 8 illustrates a procedure for (shared) RB management during handover (e.g. when the UE moves from one gNB-DU to another gNB-DU within the same gNB-CU) in NR operation. FIG. 8 depicts inter-gNB-DU mobility procedure for intra-gNB-DU.

Referring to FIG. 8, at 801, the UE sends a Measurement Report message to the source gNB-DU. At 802, the source gNB-DU sends an Uplink RRC Transfer message to the gNB-CU to convey the received Measurement Report. The source gNB-DU may simply forward the message to the UE's RRC in CU using shared SRB (e.g. shared RLC and PDCP)

At 803, the gNB-CU (e.g. per UE RRC entity) sends Change DU (or serving access node(s)) Request message to UE via the source gNB-DU, which includes new serving gNB DU(s) IDs and their corresponding resource configurations of slices and indicates to stop the data transmission for the UE.

At 804, the source gNB-DU forwards the received RRC message using shared SRB (RLC/PDCP) message to the UE. According to embodiments, the gNB DU may not (e.g. does not necessarily) maintain per UE context.

At 805, a Random Access procedure may be optionally performed at the target gNB-DU. At 806, the UE responds Change DU Response message to gNB CU (using shared SRB) to RRC entity with an indication for the SN(s) of last or previous N PDCP PDUs. According to embodiments, the UE may remain the all RLC/PDCP status variables and continues to use them for the following data transmission and reception.

Figure 9:
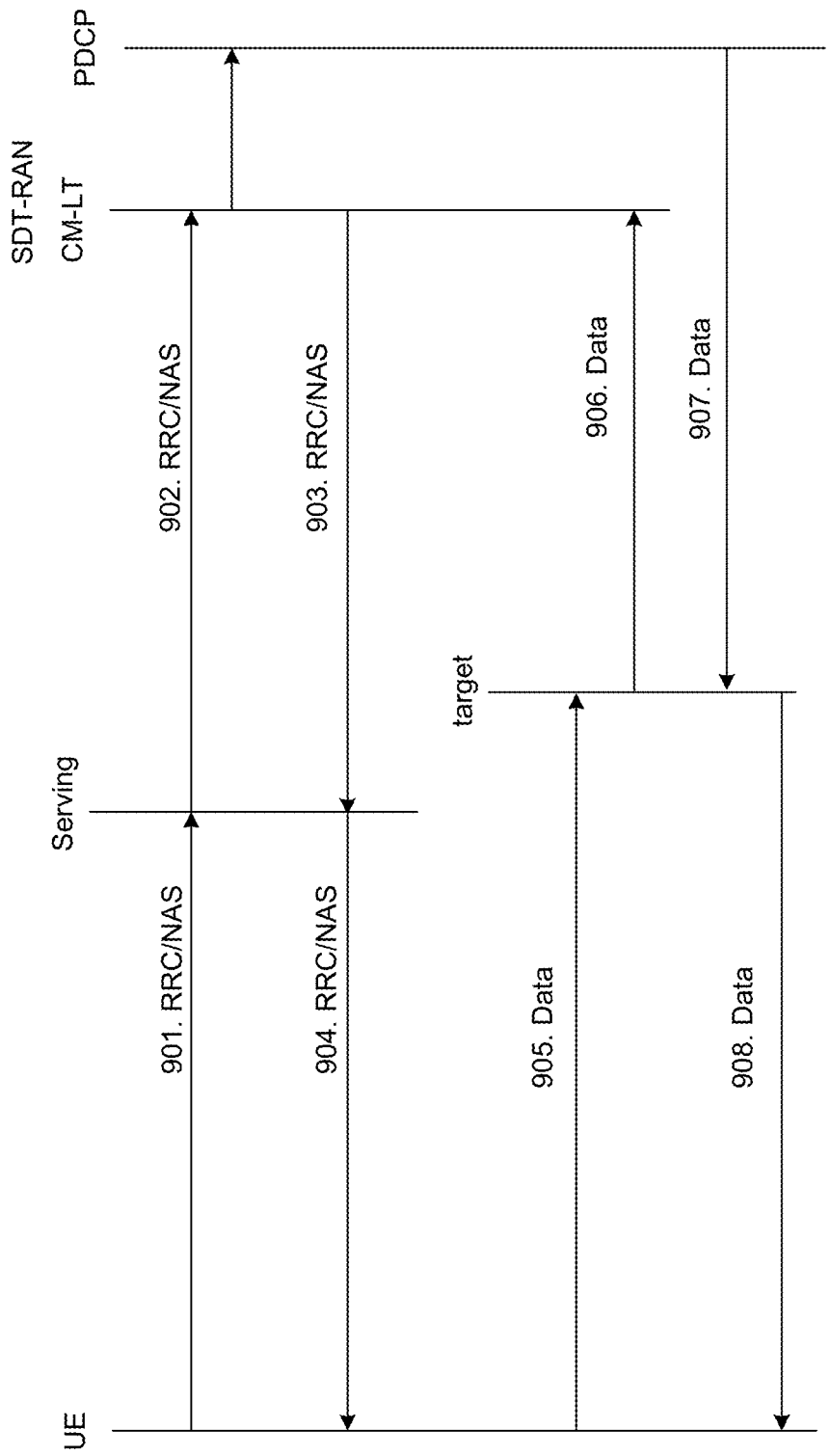
FIG. 9 is a flow diagram illustrating a procedure for shared RB management for handover without PDCP migration, accordance with embodiments.

FIG. 9 illustrates a procedure for shared RB management for handover (e.g. when the UE moves from one gNB-DU to another gNB-DU within the same gNB-CU) without PDCP migration. According to embodiments, a RAN name manager, while not shown in FIG. 9, may manage UE RAN-ID across multiple gNBs. The RAN name manager may assign a UE RAN ID to a UE during the UE registration to a PLMN or a network slice instance (NSI)/service instance (SI).

According to embodiments, handover may be triggered based on DL measurement. As preparation, discontinuous reception (DRX) may be used to measure neighbor cell(s). Three access node cells with best performance will be reported based on DL transmission measurement.

At 901 and 902, the UE sends a measurement request to SDT-RAN CM-LT (UE connectivity management for location tracking) via DU (e.g. serving access node cell). At 901, the UE forwards measurement request to the serving access node, and at 902, the serving access node cell forwards the measurement request to the SDT-RAN CM-LT entity. The SDP-RAN CM-LT is an entity of connectivity manager for per UE location tracking at node level. In some embodiments, the SDP-RAN CM-LT may cross multiple CUs. By sending the measurement request via DU, the request becomes transparent to DU.

At 903 and 904, the SDT-RAN CM-LT determines the target access node cell(s) and sends information regarding the new target node cell(s) to the UE via the serving access node cell. The information regarding the new target node cell (s) may be included in Change serving node request message (or Change serving node indication message). At 903, SDT-RAN CM-LT forwards the message with information regarding the new target node cell(s) to the serving access node, and at 904, the serving access node cell forwards the message to the UE using shared signaling radio bearers (SRB).

At 905 and 906, the UE sends Change serving node response or Location Update (LU) to SDT-RAN-LT. At 905, the UE forwards Change serving node response or LU to the target access node; and at 906, the target access node cell forwards the Change serving node response or LU to SDT-RAN-LT. According to embodiments, in case of low latency, the UE may send UL data the shared PDCP using shared DRB.

At 907 and 908, DL data transmission/UL transmission between the PDCP and the UE may occur. It should be noted that while FIG. 9 only shows DL data transmission from the PDCP to the UE, UL data transmission from the UE to the PDCP is also possible.

To operate hand over, the UE, if needed, may transmit UL data using shared UL radio bearer or send UL update to the target access node cell using shared RRC bearer; or the UE listens to DL data transmission.

According to embodiments, for UL only data transmission, there is little to no delay involved in hand over. In case of DL data transmission, LU will be directly sent to SDT-RAN-LT.

According to embodiments, shared RB can be used for LU (especially) when the UE is in RRC_INACTIVE state. Using shared RB, LU may be processed through UL short data transmission. When the UE is in RRC_INACTIVE state, the UL short data transmission may or may not use a preamble signal. When a preamble signal is used, contention-free based resource use (e.g. dedicated resource usage (assignment)) may be enabled and timing advance (TA) offset may be used by UE or network access node cell(s). When a preamble signal is not used, contention based resource use may be enabled and timing advance (TA) offset may be used by a technique called artificial intelligent access MAP (aMAP). In some embodiments, the UE may directly transmit data independent of payload length without necessity to set up per UE SRB/DRB. For such transmission, service/device/slice specific sequence may be used by the UE. When transmitting DL data, LU process is performed right before RAN/CN paging or pre-determined DL data. Data may be transmitted to UE right after the LU process via one or more access node cells without necessity to set up per UE SRB/DRB with the current serving access node cell.

According to embodiments, shared RB can be used in V2X communications. For example, for data relaying between UEs/vehicles and network, a roadside unit (RSU) may only need a single RLC for a QoS flow of all UEs associated with a slice/service. According to embodiments, a RSU may simply transmit the PDCP received to the UE. For such transmissions, in some embodiments, the resource usage may be contention based resource or contention-free based resource with fixed OTA resource. In some embodiments, the resource usage may be contention based resource or contention-free based resource with variable OTA resource. According to embodiments, UE handover may be transparent to RSUs.

Figure 10:
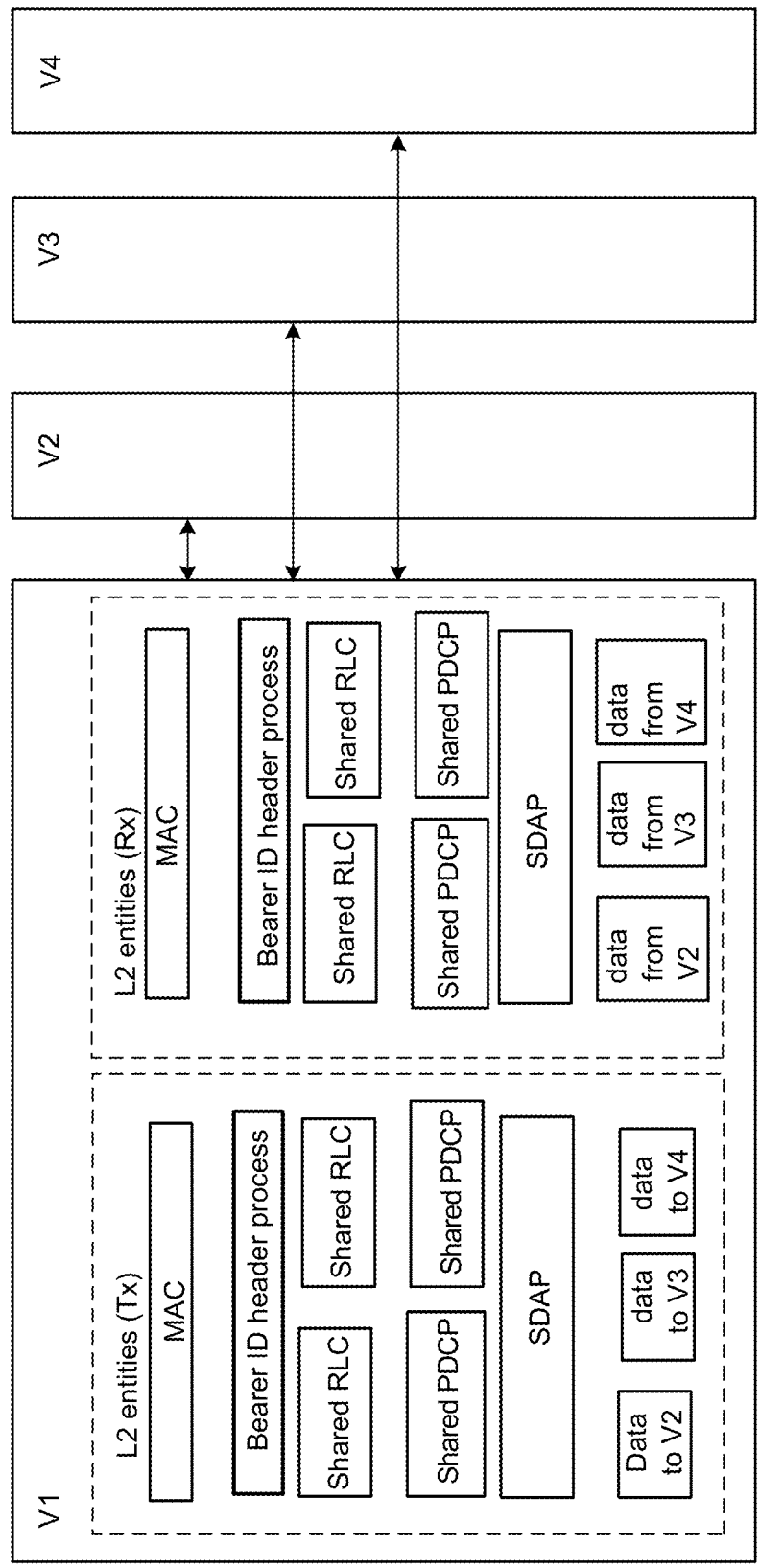
FIG. 10 is a schematic diagram illustrating one example of V2X (vehicle to everything) Layer 2 structure in full MESH communication among vehicles in accordance with embodiments.
Figure 11:
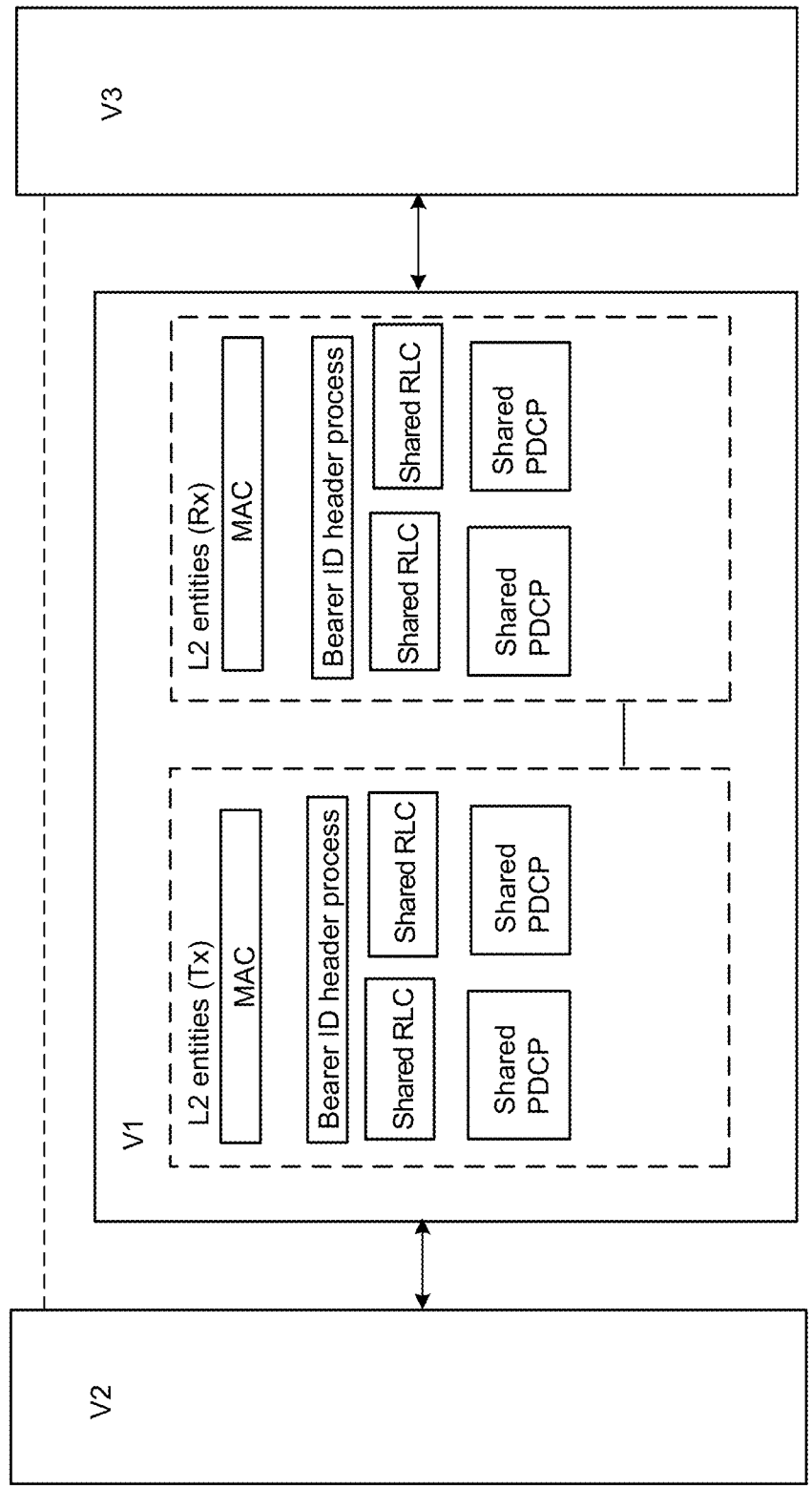
FIG. 11 is a schematic diagram illustrating one example of V2X L2 structure in indirect communication among vehicles in accordance with embodiments.

In some embodiments, a shared RB can be also used for communication between vehicles. FIGS. 10 and 11 illustrate examples of provided L2 structures in vehicles that may be used for a Vehicle-to-everything (V2X) communication implementation. FIG. 10 illustrates one example of V2X L2 structure in full MESH communication among vehicles in accordance with embodiments. The full MESH communication may be operated using unicast method. According to embodiments, each vehicle may only need one bearer for one QoS flow for communication with one or multiple other vehicles. In case of a group MESH communication, the L2 entities at each vehicle may be either pro-configured or dynamically configured at joining. In some embodiments, a vehicle may find a new vehicle by receiving a PDCP packet carrying the new ID of the 'sender vehicle' either on RRC shared SRBs or data shared DRBs. According to embodiments, both per vehicle key or group key may be used for processes, for example security process.

Referring to FIG. 10, the vehicle V1 includes L2 entities for both transmission and reception. The L2 entities for transmission include MAC entity, bearer ID header process, Shared RLC entities, Shared PDCP entities, SDAP entity and repositories/spaces for data to send the vehicles V2, V3, V4. The L2 entities for reception include MAC entity, bearer ID header process, Shared RLC entities, Shared PDCP entities, SDAP entity and repositories/spaces for data to receive from the vehicles V2, V3, V4.

Having regard to operation of the MESH communication between the vehicles, for transmission, the sender vehicle (e.g. V1) insert the targeted vehicle's ID (e.g. vehicular ID for V2, V3 or V4) in PDCP header. Other operation will be processed same as those for radio interface. For receiving data, PDCP entity in the receiving vehicle checks the received PDCP header. If information contained in the PDCP header (e.g. vehicular ID) matches with the target vehicle's vehicular ID, the target vehicle will continue to process for data reception; otherwise (e.g. if the vehicular ID does not match), the target vehicle will stop processing.

FIG. 11 illustrates one example of V2X L2 structure in indirect communication among vehicles in accordance with embodiments. According to embodiments, any vehicle can relay traffics (e.g. communication between vehicles) using shared RB if the vehicle is not the targeted vehicle. For example, as shown in FIG. 11, the vehicle V1, after detecting the targeted vehicle ID, may forward the PDCP PDU based on a configured policy on forwarding. For reliable service, the V1 may also forward RLC ACK/NACK messages when relaying traffic.

There are several potential benefits of using shared RB in V2X communication. For example, the shared RB may enable performance differentiation. The shared RB may remove the necessity to set up the (per pair of vehicles) SRB/DRB for signaling among vehicles by using shared DRB to detect a new vehicle. Furthermore, the shared RB may allow a vehicle to dynamically join a communication between (other) vehicles. (For dynamic joining to the communication, it is assumed that data and/or data transmission are protected based on UE/vehicle ID and PDCP ID).

Figure 12:
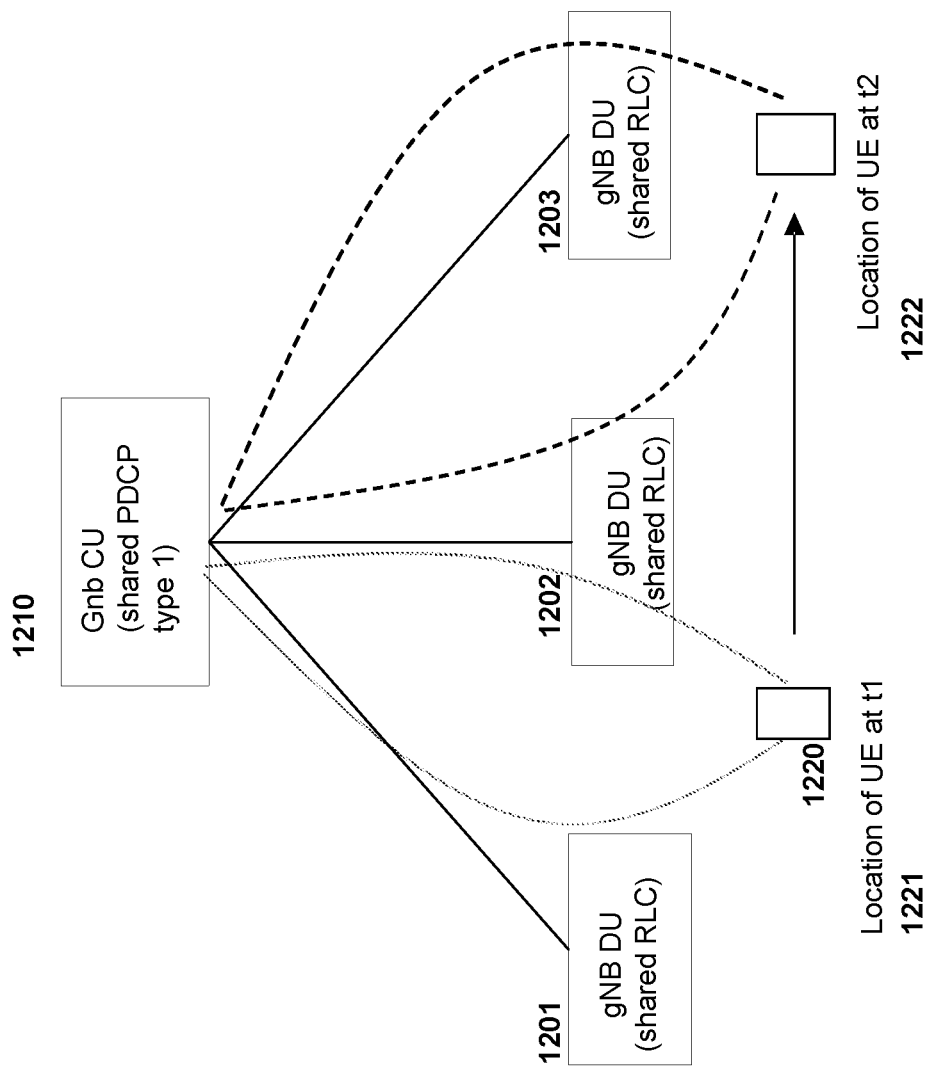
FIG. 12 is a schematic diagram illustrating operation of Ultra-Reliable Low-Latency Communication (URLLC) using shared RBs, accordance with embodiments.

FIG. 12 illustrates the operation of Ultra-Reliable Low-Latency Communication (URLLC) using shared RBs in accordance with embodiments. Referring to FIG. 12, the gNB CU 1210 with a shared Type 1 PDCP is connected to gNB DUs 1201, 1202, 1203. The UE 1220 may be moving within the area that the PDCP of the gNB CU 1210 can cover. The UE 1220 may be connected to gNB CU 1210 through gNB DU 1201 or gNB DU 1202 at time t1. The UE 1220 may be connected to gNB CU 1210 through gNB DU 1202 or gNB DU 1203 at time t2. The operation of URLLC between the UE 1220 and the gNB CU 1210 can be performed through the procedures illustrated below.

According to embodiments, in URLLC, a UE (e.g. UE 1220) may communicate with a gNB CU (e.g. gNB CU 1210) using a UE candidate access node set. The UE candidate access node set is a group of access nodes which a UE can transmit to or receive from. The UE candidate access node set may include some or all access nodes which hold shared RLCs associated with a shared PDCP. The coverage area covered by all of access nodes associated with corresponding shared PDCP may be noted as coverage of a PDCP. In case of FIG. 12, the UE candidate access node set may be the gNB DU 1201 and gNB 1202 at time t1. At time t2, the UE candidate access node set may be the gNB DU 1202 and gNB 1203. In some embodiments, RAN path management entity may determine the access nodes (cell) set for a UE, and may also inform the UE of the access nodes (cell) set.

According to embodiments, using shared RB, autonomous UL transmission from a UE is enabled in URLLC. For the operation of the autonomous UL transmission, the UE needs to know the candidate access node set. The UE may be informed of the candidate access node set when the UE enters coverage of PDCP (a list of access node IDs). In some embodiments, when the UE (e.g. UE 1220) is within the coverage and carries unique R-ID within the coverage, the UE may, at any time, transmit UL data or RRC message using shared RBs, without per UE RBs setup/release. In case of contention-based resource use, the UE can directly transmit UL packet. In case of contention-free resource use, the UE may need to use UL resource request resource (e.g. slice specific sequence); then, the UE may use the shared OTA slice/service specific resource to transmit data/message. In some embodiments, when the UE (e.g. UE 1220) is moving within a PDCP coverage, there is no RB management/control related signaling overhead during the movement of the UE within the PDCP coverage. In case of FIG. 12, there may be no RB management/control related signaling overhead during the time that the UE 1220 moved from the location 1221 to the location 1222.

According to embodiments, using dynamic cell selection process, DL transmission from a UE may be enabled in URLLC. For DL transmission, a RAN path manager (not shown in FIG. 12) may interact with a shared PDCP (e.g. shared PDCP in the gNB 1210) to update the UE's candidate access node set. Then, the PDCP may send PDCP PUUs to one or more than one access nodes in the set. Access nodes that received the PDCP PDU may either (1) determine whether to transmit to a UE or not, based on some available real-time information, such as real-time channel condition (e.g. CQI reported by UE); or (2) simply always transmit received PDCP data to a UE.

According to embodiments, in URLLC, when the UE candidate access node set is controlled by network, RRC or L1 signaling entity may be needed to assign the access node cell set.

In light of all of steps of the above methods and features described herein, various embodiments may have several potential benefits such as the followings:

- UE can on-demand and dynamically use shared RBs which may result in low overhead and latency. For example, signaling overhead related to RB set up can be reduced. In one extreme case, there may be zero signaling transmission (e.g. one case of hop-on concept). In another example, the latency related to mobility and RB procedure may be reduced.
- Operation of access node can be simplified. For example, access node (contain RLC/MAC) does not need to maintain any UE specific context.
- There is no need for RLC/MAC setup/release at serving and target for each individual UE. Further, there is no need for R-ID reassignment within a RAN zone (corresponding to one R-ID manager).
- Mobility operation is transparent to access node (UE in all states—e.g. RRC_CONNECTED, RRC_INACTIVE, RRC_IDLE) and to UE (L2 and above).
- UE is aware of HO only on L1; additional L2 action may not be required if PDCP remains unchanged and/or if PDCP migration (context transfer) is enabled.

According to embodiments, the shared RB discussed in this application is different from current RBs in 3G RBs management. For example, whereas the current RBs are at per UE/per QoS level, the shared RBs in this application are at per service/slice level.

According to embodiments, the shared RB is also different from RACH and Paging. For example, the current RACH and Paging. The current RACH and Paging has no layer 2 protocol (PDCP/RLC/MAC) or per UE RLC; thus the current RACH and Paging cannot take advantage of L2 protocol. However, according to embodiments, the shared RBs (RRC or data) can take all the advantage of L2 protocol (e.g. security, flexible/variable packet size).

According to embodiments, the protocol stack design for the shared RB is independent of any particular physical/virtual entities. The shared RB protocol stack design can be applied in any entities which communicate with multiple other entities. For example, it can be implemented at RAN edge cells, UEs, relay node(s) and its children relay/access nodes, etc.

Embodiments provide for an apparatus in a wireless communication network, comprising: a shared radio bearer (RB) layer 2 (L2) structure, the shared RB L2 structure comprising: a shared radio link control (RLC) sublayer comprising one or more shared RLC entities; and a shared packet data convergence protocol (PDCP) sublayer comprising one or more shared PDCP entities, wherein the shared RLC sublayer and the shared PDCP sublayer are implemented in one or more of: a user plane function of a core portion of the wireless communication network, a central unit (CU) of a generalized NodeB (gNB) in an access portion of the wireless communication network, a distributed unit (DU) of the gNB, and an access node in the access portion of the wireless communication network, and wherein one or more user equipment devices (UEs) or equivalent wireless communication entities use the shared RB for purpose of communication.

In some embodiments, the shared RLC sublayer and the shared PDCP sublayer are implemented in the CU of the gNB; or the shared RLC sublayer and the shared PDCP sublayer are implemented in a user plane function in the core portion of the wireless communication network; or the shared PDCP sublayer is implemented in the CU and the shared RLC sublayer is implemented in the DU or the access node; or the shared PDCP sublayer is implemented in the core portion of the wireless communication network and the shared RLC sublayer is implemented in the DU or the access node. In some embodiments, each of the one or more shared RLC entities are configured to perform RLC operations on packets being transmitted to or received from a plurality of UEs. In some embodiments, each of the one or more shared PDCP entities are configured to perform PDCP operations on packets being transmitted to or received from a plurality of UEs.

Embodiments provide for an apparatus in a wireless communication network comprising: a plurality of per-user equipment (UE) packet data convergence protocol (PDCP) entities each configured to perform one or more PDCP operations on data associated with a corresponding one of a plurality of UEs; a shared radio bearer for wirelessly communicating with the plurality of UEs, the shared radio bearer operating on data for transmission to or received from the plurality of UEs, the shared radio bearer comprising: a shared packet data convergence protocol (PDCP) entity configured to: receive downlink data from one of the per-UE PDCP entities, and apply a PDCP header to said downlink data to produce downlink output of the PCDP entity, wherein the PDCP header has an identifier value (R-ID) indicative of a corresponding one the plurality of UEs being a destination for the downlink data; and a shared radio link control (RLC) entity configured to: receive the downlink output of the shared PDCP entity, perform one or more downlink RLC operations on the downlink data, and forward output of the downlink RLC operations to a medium access control (MAC) entity for transmission; receive uplink data from the MAC entity, perform one or more uplink RLC operations on the uplink data, and forward output of the uplink RLC operations the shared PDCP entity, the shared PDCP entity further configured to: receive the output of the uplink RLC operations, read an identifier value (R-ID) from a PDCP header of the output of the uplink RLC operations, and forward data contained in the output of the uplink RLC operations to one of the per-UE PDCP entities associated with the R-ID value.

Embodiments provide for an apparatus in a wireless communication network comprising: a shared radio bearer for wirelessly communicating with a plurality of UEs, the shared radio bearer operating on data for transmission to or received from the plurality of UEs, the shared radio bearer comprising: a shared packet data convergence protocol (PDCP) entity configured to: receive downlink data for communication to one of the plurality of UEs, and perform one or more downlink PDCP operations on the downlink data; and a shared radio link control (RLC) entity configured to: receive output of the downlink PDCP operations, perform one or more downlink RLC operations on the output of the downlink PDCP operations, and forward output of the downlink RLC operations to a medium access control (MAC) entity for transmission; receive uplink data from the MAC entity, perform one or more uplink RLC operations on the uplink data, and forward output of the uplink RLC operations to the shared PDCP entity, the shared PDCP entity further configured to: receive the output of the uplink RLC operations and perform one or more uplink PDCP operations on the output of the uplink RLC operations.

In some embodiments, the shared radio bearer is implemented for the plurality of UEs having a same QoS level, belonging to a same network slice, belonging to a same UE group, or a combination thereof. In some embodiments, the MAC entity is a shared MAC entity of the shared radio bearer, the shared MAC entity configured to manage medium access control operations for communicating data to and from the plurality of UEs. In some embodiments, the shared radio bearer is a signaling radio bearer, or wherein the shared radio bearer is a data radio bearer. In some embodiments, each of the plurality of UEs comprise a shared respective radio bearer. In some embodiments, wireless resources allocated for communication with the plurality of UEs, modulation and coding schemes allocated for communication with the plurality of UEs, or both, are fixed, the apparatus further configured to communicate said fixed allocations to the plurality of UEs. In some embodiments, wireless resources allocated for communication with the plurality of UEs, modulation and coding schemes allocated for communication with the plurality of UEs, or both, are variable per transmission, the apparatus further configured to communicate said variable allocations to the plurality of UEs. In some embodiments, access to the wireless resources by the plurality of UEs is contention-based. In some embodiments, access to the wireless resources by the plurality of UEs is contention-free, the apparatus further configured to provide per-transmission resource assignment signals for use by the plurality of UEs in accessing the wireless resources.

Embodiments provide for a method of operating an apparatus in a wireless communication network, the method comprising: providing a shared radio bearer (RB) layer 2 (L2) structure comprising: a shared radio link control (RLC) sublayer comprising one or more shared RLC entities; and a shared packed data convergence protocol (PDCP) sublayer comprising one or more shared PDCP entities.

Embodiments provide for a method for wireless uplink communication with a plurality of UEs, comprising: wirelessly receiving packet segments from the plurality of UEs, each packet segment including, in an RLC header thereof, a respective packet identifier indicative of a corresponding packet to which it belongs, by a common process and irrespective of identity of UEs from which the one or more packet segments originate; using a shared uplink RLC process applied to packet segments received from all of the plurality of UEs and irrespective of UE identity, re-assembling said packet segments into corresponding packets by collecting together packet segments having matching packet identifiers, if any, the corresponding packets each having a PDCP header; subsequently associating each one of the corresponding packets with a corresponding originating one of the UEs based on PDCP header content; and forwarding each one of the corresponding packets to a per-UE PDCP process associated with the corresponding originating one of the one UEs associated with said one of the corresponding packets.

Embodiments provide for a method for wireless uplink communication with a plurality of UEs, comprising: wirelessly receiving packet segments from the plurality of UEs, each packet segment including, in an RLC header thereof, a respective packet identifier indicative of a corresponding packet to which it belongs, by a common process and irrespective of identity of UEs from which the one or more packet segments originate; using a shared uplink RLC process applied to packet segments received from all of the plurality of UEs and irrespective of UE identity, re-assembling said packet segments into corresponding packets by collecting together packet segments having matching packet identifiers, if any, the corresponding packets each having a PDCP header; and using a shared PDCP process applied to packet segments received from all of the plurality of UEs and irrespective of UE identity, performing one or more PDCP operations on said corresponding packets.

Embodiments provide for a method for wireless downlink communication with a plurality of UEs, comprising, by a shared radio bearer: receiving downlink data from one a plurality of per-UE packet data convergence protocol (PDCP) entities, the downlink data for transmission to a corresponding UE; applying a PDCP header to said downlink data to produce PDCP downlink output, the PDCP header having an identifier value (R-ID) indicative of the corresponding UE; performing one or more downlink RLC operations on the PDCP downlink output to produce RLC downlink output; and wirelessly transmitting the RLC downlink output for reception by the corresponding UE using a shared MAC process.

Embodiments provide for a method for wireless downlink communication with a plurality of UEs, comprising, by a shared radio bearer: receiving downlink data for transmission to a corresponding UE; perform one or more downlink PDCP operations on the downlink data to produce PDCP downlink output; performing one or more downlink RLC operations on the PDCP downlink output to produce RLC downlink output; and wirelessly transmitting the RLC downlink output for reception by the corresponding UE using a shared MAC process.

In some embodiments, the RLC operations and the PDCP are implemented in one or more of: a user plane function of a core portion of the wireless communication network, a central unit CU of a gNB in an access portion of the wireless communication network, a distributed unit DU of the gNB, and an access node in the access portion of the wireless communication network. In some embodiments, the RLC operations and the PDCP operations are implemented in the CU of the gNB; or the RLC operations and the PDCP operations are implemented in a user plane function in the core portion of the wireless communication network; or the PDCP operations are implemented in the CU and the RLC operations are implemented in the DU or the access node; or the PDCP operations are implemented in the core portion of the wireless communication network and the RLC operations implemented in the DU or the access node.

Embodiments provide for a UE comprising a UE-side shared radio bearer configured to interoperate with the shared radio bearer L2 structure of the apparatus of as described above. Embodiments of the present invention provide for a system comprising the apparatus and UE as described above.

Embodiments provide for a path manager apparatus in a wireless communication network configured to: receive location information for a mobile UE; determine one or more access nodes capable of forwarding downlink data to the mobile UE based on the location information; and transmit, to a PDCP entity shared by a plurality of access nodes including the determined one or more access nodes, an indication of the determined one or more access nodes capable of forwarding downlink data to the mobile UE, wherein the PDCP entity subsequently transmits PDCP PDUs, for reception by the mobile UE, to at least one of the determined one or more access nodes.

In some embodiments, the path manager apparatus is further configured to: receive location information for each UE of a group of two or more mobile UEs including the mobile UE, said each UE subscribing to a multicast service or a broadcast service; determine access nodes capable of forwarding downlink data to each UE of the group of two or more mobile UEs; and transmit, to a PDCP entity shared by a plurality of access nodes including the determined one or more access nodes, an indication of the determined one or more access nodes capable of forwarding downlink data to UEs of the group of two or more mobile UE, wherein the PDCP entity subsequently transmits PDCP PDUs, for reception by UEs of the group of two or more mobile UE, to at least one of the determined one or more access nodes.

Embodiments provide for a R-ID manager apparatus in a wireless communication network configured to: maintain a list of access nodes associated with a common zone; maintain a pool of assignable R-ID values for the common zone; responsive to a UE becoming associated with one or more access nodes associated with the common zone, assigning a currently unassigned one of the R-ID values to the UE, and creating a mapping relation between the assigned R-ID value and a UE ID of the UE; causing one or more PDCP entities to be informed of the assigned R-ID value for use thereby in uplink communication, downlink communication, or both; and causing the UE to be informed of the assigned R-ID value for use thereby in uplink communication, downlink communication, or both.

In some embodiments, the R-ID manager apparatus is configured to assign said currently unassigned one of the R-ID values to the UE so that the UE is uniquely identified within one or both of: a predetermined geographic area; and a predetermined network slice.

Embodiments provide a method for wireless downlink communication with a plurality of user equipments (UEs), the method performed by an apparatus which supports a shared radio bearer, the apparatus including a shared packet data convergence protocol (PDCP) entity, a shared radio link control (RLC) entity and a shared medium access control (MAC) entity. The method includes receiving, by the shared PDCP entity, downlink data for transmission to a corresponding UE and performing, by the shared PDCP entity, one or more downlink PDCP operations on the downlink data to produce PDCP downlink output. The method further includes performing, by the shared RLC entity, one or more downlink RLC operations on the PDCP downlink output to produce RLC downlink output and wirelessly transmitting, by the shared MAC entity, the RLC downlink output for reception by the corresponding UE.

In some embodiments, the shared radio bearer is implemented for the plurality of UEs having one or more of: a same QoS level, belonging to a same network slice and belonging to a same UE group.

In some embodiments, the shared PDCP entity is configured to perform PDCP operations on one or more of: a per slice basis, a per service basis and a per group basis.

Embodiments provide a method for wireless uplink communication with a plurality of user equipments (UEs), the method performed by an apparatus which supports a shared radio bearer, the apparatus including a shared packet data convergence protocol (PDCP) entity, a shared radio link control (RLC) entity and a shared medium access control (MAC) entity. The method includes wirelessly receiving, by the shared MAC entity, packet segments from the plurality of UEs, each packet segment including, in an RLC header thereof, a respective packet identifier indicative of a corresponding packet to which it belongs and re-assembling, by the shared RLC entity, said packet segments into corresponding packets by collecting together packet segments having matching packet identifiers, the corresponding packets each having a PDCP header. The method further includes performing, by the shared PDCP entity, one or more PDCP operations on said corresponding packets.

Figure 13:
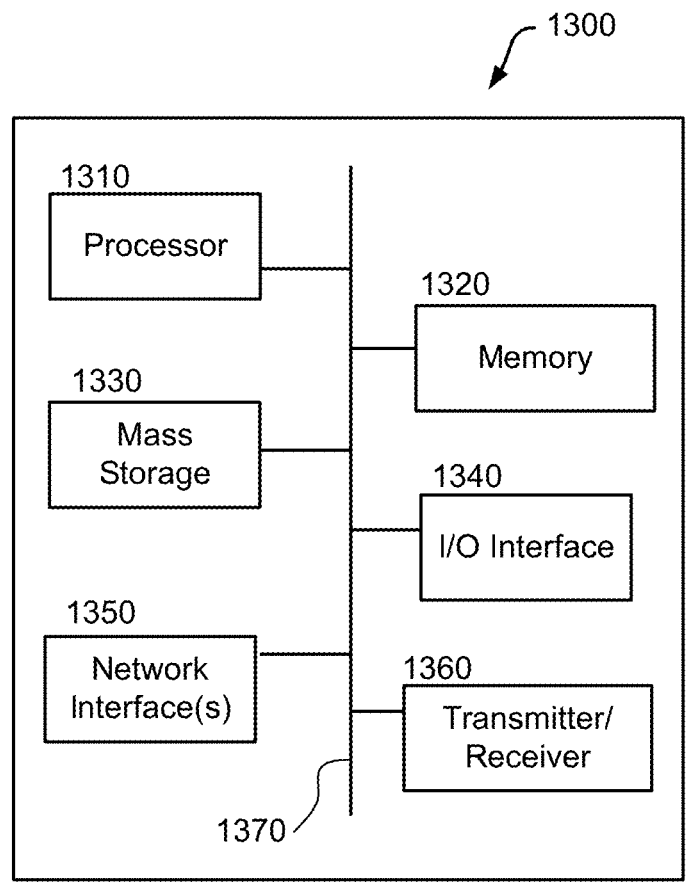
FIG. 13 is a schematic diagram of an electronic device, accordance with embodiments.

FIG. 13 is a schematic diagram of an electronic device 1300 that may perform any or all of steps of the above methods and features described herein, according to different embodiments. For example, a UE may be configured as electronic device 1300. Further, a network element (e.g. RAN edge cells, relay node, access node, RAN path manager, R-ID manager) hosting any of the steps/methods and comprising elements described herein may be configured as the electronic device 1300. The electronic device may be configured to operate as one or more entities, processes, layers or sub-layers, shared PDCPs, shared RBs, shared RLCs, as described herein As shown, the device includes a processor 1310, memory 1320, non-transitory mass storage 1330, I/O interface 1340, network interface 1350, and a transceiver 1360, all of which are communicatively coupled via bi-directional bus 1370. According to certain embodiments, any or all of the depicted elements may be utilized, or only a subset of the elements. Further, the device 1300 may contain multiple instances of certain elements, such as multiple processors, memories, or transceivers. Also, elements of the hardware device may be directly coupled to other elements without the bi-directional bus.

The memory 1320 may include any type of non-transitory memory such as static random access memory (SRAM), dynamic random access memory (DRAM), synchronous DRAM (SDRAM), read-only memory (ROM), any combination of such, or the like. The mass storage element 1330 may include any type of non-transitory storage device, such as a solid state drive, hard disk drive, a magnetic disk drive, an optical disk drive, USB drive, or any computer program product configured to store data and machine executable program code. According to certain embodiments, the memory 1320 or mass storage 1330 may have recorded thereon statements and instructions executable by the processor 1310 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. An apparatus in a wireless communication network, comprising: a shared radio bearer layer 2 (L2) structure, the shared RB L2 structure being implemented at the wireless communication network and a plurality of user equipment devices (UEs), the shared RB L2 structure comprising:
    a shared radio link control (RLC) sublayer comprising a shared RLC entity shared by the plurality of user equipment devices (UEs) at the network side and a corresponding RLC entity at each of the plurality of UEs; and
    a shared packet data convergence protocol (PDCP) sublayer comprising a shared PDCP entity shared by the plurality of user equipment devices (UEs) or other wireless communication entities, the shared PDCP shared at the network side and a corresponding PDCP entity at each of the plurality of UEs or other wireless communication entities, and
    wherein the shared RLC sublayer and the shared PDCP sublayer are implemented in one or more of: a user plane function of a core portion of the wireless communication network, a central unit (CU) of a generalized NodeB (gNB) in an access portion of the wireless communication network, a distributed unit (DU) of the gNB, and an access node in the access portion of the wireless communication network.

2. The apparatus of claim 1, wherein:
    the shared RLC sublayer and the shared PDCP sublayer are implemented in the CU of the gNB; or
    the shared RLC sublayer and the shared PDCP sublayer are implemented in a user plane function in the core portion of the wireless communication network; or
    the shared PDCP sublayer is implemented in the CU and the shared RLC sublayer is implemented in the DU or the access node; or
    the shared PDCP sublayer is implemented in the core portion of the wireless communication network and the shared RLC sublayer is implemented in the DU or the access node.

3. The apparatus of claim 1, wherein the shared RLC entity is configured to perform RLC operations on packets being transmitted to or received from a plurality of UEs.

4. The apparatus of claim 1, wherein the shared PDCP entity is configured to perform PDCP operations on packets being transmitted to or received from a plurality of UEs.

5. The apparatus of claim 1, wherein the shared RB L2 structure is implemented for the plurality of UEs having one or more of: a same QoS level, belonging to a same network slice and belonging to a same UE group.

6. The apparatus of claim 1, wherein a MAC entity associated with the shared RB L2 structure is a shared MAC entity of the shared radio bearer, the shared MAC entity configured to manage medium access control operations for communicating data to and from the plurality of UEs.

7. The apparatus of claim 1, wherein the shared RB L2 structure is a signaling radio bearer, or wherein the shared radio bearer is a data radio bearer.

8. The apparatus of claim 1, wherein wireless resources allocated for communication with the plurality of UEs, modulation and coding schemes allocated for communication with the plurality of UEs, or both, are fixed, the apparatus further configured to communicate said fixed allocations to the plurality of UEs.

9. The apparatus of claim 1, wherein wireless resources allocated for communication with the plurality of UEs, modulation and coding schemes allocated for communication with the plurality of UEs, or both, are variable per transmission, the apparatus further configured to communicate said variable allocations to the plurality of UEs.

10. The apparatus of claim 1, wherein access to wireless resources for communication by the plurality of UEs is contention-based.

11. The apparatus of claim 1, wherein access to wireless resources for communication by the plurality of UEs is contention-free, the apparatus further configured to provide per-transmission resource assignment signals for use by the plurality of UEs in accessing the wireless resources.

12. The apparatus of claim 1, wherein the shared PDCP entity is configured to create a PDCP protocol data unit (PDU) including a PDCP header, the PDCP header including one or more of a UE identifier, a sequence number and a slice identifier.

13. The apparatus of claim 1, wherein the shared RLC entity is configured to create a RLC protocol data unit (PDU) including a RLC header, the RLC header including one or more of a UE identifier, a packet identifier, a segment identifier, a slice identifier and a description of a payload in the RLC PDU.

14. The apparatus of claim 13, wherein the RLC header includes a packet identifier, the packet identifier selected from a random identifier pool by the shared RLC entity.

15. A method for wireless downlink communication with a plurality of user equipment devices (UEs) using a wireless communication network, the method performed by an apparatus which supports a shared radio bearer implemented at the wireless communication network and the plurality of UEs, the apparatus including: a plurality of per-UE packet data convergence protocol (PDCP) entities at the network side, a shared PDCP entity shared by the plurality of UEs at the network side and a corresponding PDCP entity at each of the plurality of UEs, a shared radio link control (RLC) entity shared by the plurality of UEs at the network side and a corresponding RLC entity at each of the plurality of UEs, and a shared medium access control (MAC) entity, the shared PDCP entity and the shared RLC entity shared by the plurality of UEs, the method comprising:

receiving, by the shared PDCP entity, downlink data from one of the plurality of per-UE PDCP entities, the downlink data for transmission to a corresponding UE;

applying, by the shared PDCP entity, a PDCP header to said downlink data to produce PDCP downlink output, the PDCP header having an identifier (R-ID) value indicative of the corresponding UE;

performing, by the shared RLC entity, one or more downlink RLC operations on the PDCP downlink output to produce RLC downlink output; and wirelessly transmitting, by the shared MAC entity, the RLC downlink output for reception by the corresponding UE.

16. The method of claim 15, wherein the shared radio bearer is implemented for the plurality of UEs having one or more of: a same QoS level, belonging to a same network slice and belonging to a same UE group.

17. The method of claim 15, wherein the R-ID value assigned to a particular UE uniquely identifies the UE within one or more of a predetermined geographic area and a predetermined network slice.

18. The method of claim 15, wherein the shared RLC entity is configured to assign an identifier to each PDCP protocol data unit (PDU) received.

19. The method of claim 15, wherein the shared RLC entity is configured to assign a segment identifier to a PDCP PDU when segmentation of the PDCP PDU is required.

20. The method of claim 15, wherein the shared PDCP entity is configured to perform PDCP operations relating to the R-I D.

21. The method of claim 15, wherein each of the per-UE PDCP entities perform PDCP operations on a per UE basis.

22. A method for wireless uplink communication with a plurality of user equipment devices (UEs) using a wireless communication network, the method performed by an apparatus which supports a shared radio bearer implemented at the wireless communication network and the plurality of UEs, the apparatus including a plurality of per-UE packet data convergence protocol (PDCP) entities at the network side, a shared PDCP entity shared by the plurality of UEs at the network side and a corresponding PDCP entity at each of the plurality of UEs, a shared radio link control (RLC) entity shared by the plurality of UEs at the network side and a corresponding RLC entity at each of the plurality of UEs, and a shared medium access control (MAC) entity, the shared PDCP entity and the shared RLC entity shared by the plurality of UEs, the method comprising:

wirelessly receiving, by the shared MAC entity, packet segments from the plurality of UEs, each packet segment including, in an RLC header thereof, a respective packet identifier indicative of a corresponding packet to which each packet segment belongs;

re-assembling, by the shared RLC entity, said packet segments into corresponding packets by collecting together packet segments having matching packet identifiers, the corresponding packets each having a PDCP header having an identifier (R-ID) value indicative of the corresponding UE;

associating, by the shared PDCP entity, each one of the corresponding packets with a corresponding originating one of the UEs based on the R-ID value; and forwarding, by the shared PDCP entity, each one of the corresponding packets to a per-UE PDCP entity associated with the corresponding originating one of the one UEs associated with said one of the corresponding packets.

23. The method of claim 22, wherein the R-ID value assigned to a particular UE uniquely identifies the UE within one or more of a predetermined geographic area and a predetermined network slice.

24. The method of claim 22, one or more of the packet segments encapsulate a PDCP protocol data unit (PDU) or one or more of the packet segments encapsulate a segment of a PDCP PDU.

25. The method of claim 22, during re-assembling said packet segments, the shared RLC entity, upon determination of a missing packet segment, triggers retransmission of the missing packet segment.

* * * * *